(12) United States Patent
Behar et al.

(10) Patent No.: US 12,217,101 B2
(45) Date of Patent: Feb. 4, 2025

(54) METHODS AND APPARATUS TO CONFIGURE HETEROGENOUS COMPONENTS IN AN ACCELERATOR

(71) Applicant: INTEL CORPORATION, Santa Clara, CA (US)

(72) Inventors: Michael Behar, Zichron Yaakov (IL); Moshe Maor, Kiryat Mozking (IL); Ronen Gabbai, Ramat Hashofet (IL); Roni Rosner, Binyamina (IL); Zigi Walter, Haifa (IL); Oren Agam, Zichron Yaacov (IL)

(73) Assignee: INTEL CORPORATION, Santa Clara, CA (US)

( * ) Notice: Subject to any disclaimer, the term of this patent is extended or adjusted under 35 U.S.C. 154(b) by 94 days.

(21) Appl. No.: 18/309,650

(22) Filed: Apr. 28, 2023

(65) Prior Publication Data
US 2023/0333913 A1 Oct. 19, 2023

Related U.S. Application Data

(63) Continuation of application No. 16/541,979, filed on Aug. 15, 2019, now Pat. No. 11,675,630.

(51) Int. Cl.
*G06F 9/50* (2006.01)
*G06F 16/901* (2019.01)
*G06N 3/044* (2023.01)
*G06N 3/045* (2023.01)

(52) U.S. Cl.
CPC ........ *G06F 9/5083* (2013.01); *G06F 16/9024* (2019.01); *G06N 3/044* (2023.01); *G06N 3/045* (2023.01)

(58) Field of Classification Search
CPC .... G06F 9/5083; G06F 16/9024; G06N 3/045
See application file for complete search history.

(56) References Cited

U.S. PATENT DOCUMENTS

| | | | |
|---|---|---|---|
| 9,747,138 B2 * | 8/2017 | Miwa | G06F 9/5083 |
| 2010/0274972 A1 | 10/2010 | Babayan | |
| 2012/0054771 A1 | 3/2012 | Krishnamurthy et al. | |
| 2013/0160016 A1 | 6/2013 | Gummaraju et al. | |

(Continued)

FOREIGN PATENT DOCUMENTS

EP 3779673 B1 8/2022

OTHER PUBLICATIONS

European Patent Office, "Search Report," issued in connection with European patent appl. No. 20179925.1, Dec. 2, 2020, 7 pages.

(Continued)

*Primary Examiner* — Kristie D Shingles
(74) *Attorney, Agent, or Firm* — HANLEY, FLIGHT & ZIMMERMAN, LLC

(57) ABSTRACT

Methods, apparatus, systems and articles of manufacture are disclosed to configure heterogenous components in an accelerator. An example apparatus includes a graph compiler to identify a workload node in a workload and generate a selector for the workload node, and the selector to identify an input condition and an output condition of a compute building block, wherein the graph compiler is to, in response to obtaining the identified input condition and output condition from the selector, map the workload node to the compute building block.

20 Claims, 7 Drawing Sheets

(56) References Cited

U.S. PATENT DOCUMENTS

2019/0205737 A1   7/2019  Bleiweiss et al.
2019/0370084 A1  12/2019  Behar et al.
2020/0019391 A1   1/2020  Yang
2020/0159568 A1   5/2020  Goyal

OTHER PUBLICATIONS

European Patent Office, "Communication under Rule 71(3) EPC," issued in connection with European patent appl. No. 20179925.1, Mar. 22, 2022, 5 pages.
United States Patent and Trademark Office, "Non-Final Office Action", issued in connection with U.S. Appl. No. 16/541,979, filed Aug. 18, 2022, 6 pages.
United States Patent and Trademark Office, "Notice of Allowance" issued in U.S. Appl. No. 16/541,979, filed Feb. 1, 2023, 8 pages.
United States Patent and Trademark Office, "Corrected Notice of Allowability", issued in connection with U.S. Appl. No. 16/541,979, filed Feb. 15, 2023, 2 pages.

\* cited by examiner

METHODS AND APPARATUS TO CONFIGURE HETEROGENOUS COMPONENTS IN AN ACCELERATOR

RELATED APPLICATION

This patent arises from a continuation of U.S. patent application Ser. No. 16/541,979 (now U.S. Pat. No. 11,675,630), which was filed on Aug. 15, 2019. U.S. patent application Ser. No. 16/541,979 is hereby incorporated herein by reference in its entirety. Priority to U.S. patent application Ser. No. 16/541,979 is hereby claimed.

FIELD OF THE DISCLOSURE

This disclosure relates generally to processing, and, more particularly, to methods and apparatus to configure heterogenous components in an accelerator.

BACKGROUND

Computer hardware manufacturers develop hardware components for use in various components of a computer platform. For example, computer hardware manufacturers develop motherboards, chipsets for motherboards, central processing units (CPUs), hard disk drives (HDDs), solid state drives (SSDs), and other computer components. Additionally, computer hardware manufacturers develop processing elements, known as accelerators, to accelerate the processing of a workload. For example, an accelerator can be a CPU, a graphics processing units (GPUs), a vision processing units (VPUs), and/or a field programmable gate arrays (FPGAs).

Figure 1:
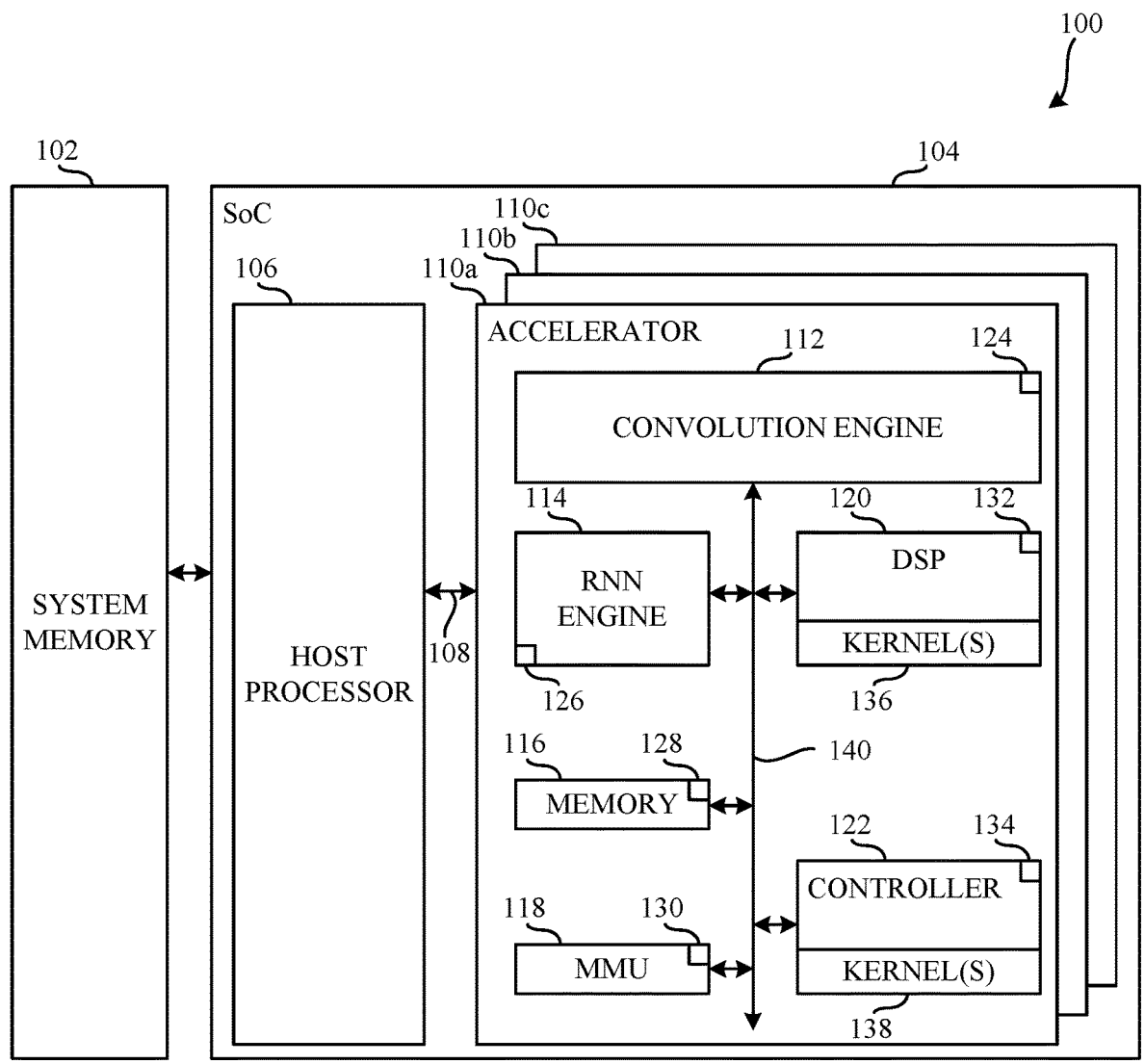
FIG. 1 is a block diagram illustrating an example computing system to configure heterogeneous components in an accelerator.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Many computing hardware manufacturers develop processing elements, known as accelerators, to accelerate the processing of a workload. For example, an accelerator can be a CPU, a GPU, a VPU, and/or an FPGA. Moreover, accelerators, while capable of processing any type of workload are designed to optimize particular types of workloads. For example, while CPUs and FPGAs can be designed to handle more general processing, GPUs can be designed to improve the processing of video, games, and/or other physics and mathematically based calculations, and VPUs can be designed to improve the processing of machine vision tasks.

Additionally, some accelerators are designed specifically to improve the processing of artificial intelligence (AI) applications. While a VPU is a specific type of AI accelerator, many different AI accelerators can be used. In fact, many AI accelerators can be implemented by application specific integrated circuits (ASICs). Such ASIC-based AI accelerators can be designed to improve the processing of tasks related to a particular type of AI, such as machine learning (ML), deep learning (DL), and/or other artificial machine-driven logic including support vector machines (SVMs), neural networks (NNs), recurrent neural networks (RNNs), convolutional neural networks (CNNs), long short term memory (LSTM), gate recurrent units (GRUs), etc.

Computer hardware manufactures also develop heterogeneous systems that include more than one type of processing element. For example, computer hardware manufactures may combine both general purpose processing elements, such as CPUs, with either general purpose accelerators, such as FPGAs, and/or more tailored accelerators, such as GPUs, VPUs, and/or other AI accelerators. Such heterogeneous systems can be implemented as systems on a chip (SoCs).

When a developer desires to run a function, algorithm, program, application, and/or other code on a heterogeneous system, the developer and/or software generates a schedule (e.g., a graph) for the function, algorithm, program, application, and/or other code at compile time. Once a schedule is generated, the schedule is combined with the function, algorithm, program, application, and/or other code specification to generate an executable file (either for Ahead of Time or Just in Time paradigms). Moreover, the schedule combined with the function, algorithm, program, application, and/or other code may be represented as a graph including nodes, where the graph represents a workload and each node (e.g., a workload node) represents a particular task of that workload. Furthermore, the connections between the different nodes in the graph represent the data inputs and/or outputs needed to in order for a particular workload node to be executed and the vertices of the graph represent data dependencies between workload nodes of the graph.

Common implementations to compile a schedule (e.g., a graph) include a graph compiler that receives the schedule (e.g., graph) and assigns various workload nodes of the workload to various compute building blocks (CBBs) located within an accelerator. In heterogenous systems, the graph compiler is individually configured to communicate with each independent CBB. For example, in order for the graph compiler to assign and/or otherwise send a workload node to a DSP and/or a kernel located in the DSP, such a graph compiler has to have knowledge of the input and output conditions (e.g., the types of inputs and the type of outputs) that the DSP includes. In heterogenous systems that include a variety of computational building blocks (CBBs), or heterogenous systems that receive and/or otherwise obtain a variety of workload nodes to be executed on a variety of CBBs, execution using a single graph compiler becomes computationally intensive. Moreover, communication and control among the CBBs during runtime is often impractical due to the heterogenous nature of the system. Likewise, data exchange synchronization among CBBs is often computationally intensive.

Additionally, the assignment of various workload nodes of the workload to various kernels located within the heterogenous system likewise requires the graph compiler to be individually configured to communicate with each independent kernel. In addition, kernels are often loaded into an accelerator post-production by a user and, as such, would require reconfiguration of the graph compiler. For example, a graph compiler may not be able to communicate (e.g., send workload nodes) to a kernel that has been produced and/or otherwise loaded into an accelerator after the initial configuration of the graph compiler.

Examples disclosed herein include methods and apparatus to configure heterogenous components in an accelerator. Examples disclosed herein include an accelerator operable using any arbitrary schedule and/or graph. For example, examples disclosed herein include a graph compiler that can efficiently understand and map an arbitrary schedule and/or graph into the accelerator. Operation of such examples disclosed herein is explained in further detail, below.

Examples disclosed herein include the abstraction and/or generalization of various CBBs during compilation time. Examples disclosed herein include adopt a common identification for the CBBs. For example, each CBB, whether heterogenous or not, may be identified by generating a respective selector to interact with the CBB. In such an example, a selector is generated in response to analyzing the workload nodes in the workload. Because each workload node often includes details on the type of CBB to be used to execute, a selector can be made to interact with such a CBB. In examples disclosed herein, the selector determines the input and/or output conditions of such CBB. The selectors made be distinct entities that are capable of communicating with the workload and the CBBs in the workload (e.g., communicate in the workload domain and the CBB domain). As a result, a graph compiler includes a plugin to enable operation in the workload domain. As used herein, workload domain refers to a level of abstraction and/or generalization based off the workload. Likewise, as used herein, CBB domain refers to a level of abstraction and/or generalization, in more detail than the workload domain, based off the CBB(s). Such examples disclosed herein enable the abstraction of a CBB that is either inherent to a system, or included in the system at a later time.

Examples disclosed herein utilize buffers being identified as input and output buffers. In such examples disclosed herein, a pipeline of CBBs acting as either a producer (e.g., a CBB that generates and/or otherwise writes data for use by another CBB) or a consumer (e.g., a CBB that obtains and/or otherwise reads data produced by another CBB) is/are implemented using the buffers. By implementing a pipeline of CBBs acting as either a producer or a consumer, a graph compiler can use generic heuristics (e.g., techniques designed for solving a problem, heuristics operating in the workload domain) when sizing and/or allocating workload nodes (e.g., tasks) of a workload (e.g., graph) to each CBB. In some examples disclosed herein, the graph compiler may provide information that may include a size and a number of slots of a buffer (e.g., storage size) to execute a workload node (e.g., task). In such a manner, an example credit manager may generate n number of credits based on the n number of slots in the buffer. The n number of credits, therefore, are indicative of an available n number of spaces in a memory that a CBB can write to or read from. The credit generator provides the n number of credits to an example configuration controller to package and send to a corresponding producer and/or consumer, determined by the configuration controller and communicated over an example fabric (e.g., a control and configure fabric).

Furthermore, examples disclosed herein include implementing a standard representation of CBBs toward a graph compiler. Examples disclosed herein include a selector configured for each workload node in a workload. The selector is configured to identify standard input and/or output conditions of the CBB identified by the corresponding workload node. Further, such a selector is configured to provide a list of abstracted devices, specified by their input and/or output conditions, to the graph compiler. In such examples disclosed herein, the graph compiler includes a plugin that can form a translation layer between the workload nodes (e.g., tasks) in a workload (e.g., graph) and the various CBBs (e.g., a translation layer between the CBB domain and the workload domain) to enable mapping of the workload nodes (e.g., tasks) to the various CBBs. In addition, in some examples disclosed herein, the selector may convey specific requirements of the associated CBB back to the graph compiler. For example, a selector may communicate to the graph compiler that such a CBB requires a certain percentage of memory allocation in order to operate.

During runtime, examples disclosed herein include a common architecture used to configure the CBBs an enable communication among the CBBs. Examples disclosed herein utilize a system of credits in conjunction with the pipeline generated by the graph compiler. Such a system enables both the graph compiler to map workload nodes (e.g., tasks) from a workload (e.g., graph) into the producer and consumer pipeline and enable communication among the CBBs. Once a CBB acting as the initial producer (e.g., a CBB executing a workload node indicating to write data) completes the execution of the workload node, the credits are sent back to the point of origin as seen by the CBB rather than to the next CBB. Such point of origin may be a credit manager in examples disclosed herein.

FIG. 1 is a block diagram illustrating an example computing system 100 to configure heterogeneous components in an accelerator. In the example of FIG. 1, the computing system 100 includes an example system memory 102 and an example heterogeneous system 104. The example heterogeneous system 104 includes an example host processor 106, an example first communication bus 108, an example first accelerator 110a, an example second accelerator 110b, and an example third accelerator 110c. Each of the example first accelerator 110a, the example second accelerator 110b, and the example third accelerator 110c includes a variety of CBBs that are both generic and/or specific to the operation of the respective accelerators.

In the example of FIG. 1, the system memory 102 may be implemented by any device for storing data such as, for example, flash memory, magnetic media, optical media, etc. Furthermore, the data stored in the example system memory 102 may be in any data format such as, for example, binary data, comma delimited data, tab delimited data, structured query language (SQL) structures, etc. The system memory 102 is coupled to the heterogeneous system 104. In FIG. 1, the system memory 102 is a shared storage between at least one of the host processor 106, the first accelerator 110a, the second accelerator 110b and the third accelerator 110c. In the example of FIG. 1, the system memory 102 is a physical storage local to the computing system 100; however, in other examples, the system memory 102 may be external to and/or otherwise be remote with respect to the computing system 100. In further examples, the system memory 102 may be a virtual storage. In the example of FIG. 1, the system memory 102 is a non-volatile memory (e.g., read only memory (ROM), programmable ROM (PROM), erasable PROM (EPROM), electrically erasable PROM (EEPROM), etc.). In other examples, the system memory 102 may be a non-volatile basic input/output system (BIOS) or a flash storage. In further examples, the system memory 102 may be a volatile memory.

In FIG. 1, the heterogeneous system 104 is coupled to the system memory 102. In the example of FIG. 1, the heterogeneous system 104 processes a workload by executing the workload on the host processor 106 and/or one or more of the first accelerator 110a, the second accelerator 110b, or the third accelerator 110c. In FIG. 1, the heterogeneous system 104 is a system on a chip (SoC). Alternatively, the heterogeneous system 104 may be any other type of computing or hardware system.

In the example of FIG. 1, the host processor 106 is a processing element configured to execute instructions (e.g., machine-readable instructions) to perform and/or otherwise facilitate the completion of operations associated with a computer and/or or computing device (e.g., the computing system 100). In the example of FIG. 1, the host processor 106 is a primary processing element for the heterogeneous system 104 and includes at least one core. Alternatively, the host processor 106 may be a co-primary processing element (e.g., in an example where more than one CPU is utilized) while, in other examples, the host processor 106 may be a secondary processing element.

In the illustrated example of FIG. 1, one or more of the first accelerator 110a, the second accelerator 110b, and/or the third accelerator 110c are processing elements that may be utilized by a program executing on the heterogeneous system 104 for computing tasks, such as hardware acceleration. For example, the first accelerator 110a is a processing element that includes processing resources that are designed and/or otherwise configured or structured to improve the processing speed and overall performance of processing machine vision tasks for AI (e.g., a VPU).

In examples disclosed herein, each of the host processor 106, the first accelerator 110a, the second accelerator 110b, and the third accelerator 110c is in communication with the other elements of the computing system 100 and/or the system memory 102. For example, the host processor 106, the first accelerator 110a, the second accelerator 110b, the third accelerator 110c, and/or the system memory 102 are in communication via the first communication bus 108. In some examples disclosed herein, the host processor 106, the first accelerator 110a, the second accelerator 110b, the third accelerator 110c, and/or the system memory 102 may be in communication via any suitable wired and/or wireless communication method. Additionally, in some examples disclosed herein, each of the host processor 106, the first accelerator 110a, the second accelerator 110b, the third accelerator 110c, and/or the system memory 102 may be in communication with any component exterior to the computing system 100 via any suitable wired and/or wireless communication method.

In the example of FIG. 1, the first accelerator 110a includes an example convolution engine 112, an example RNN engine 114, an example memory 116, an example memory management unit (MMU) 118, an example DSP 120, and an example controller 122. In examples disclosed herein, any of the convolution engine 112, the RNN engine 114, the memory 116, the memory management unit (MMU) 118, the DSP 120, and/or the controller 122 may be referred to as a CBB. In some examples disclosed herein, the memory 116 and/or the MMU 118 may be referred to as infrastructure elements. For example, the memory 116 and/or the MMU 118 may be implemented externally to the first accelerator 110a. Each of the example convolution engine 112, the example RNN engine 114, the example memory 116, the example MMU 118, the example DSP 120, and the example controller 122 includes an example first scheduler 124, an example second scheduler 126, an example third scheduler 128, an example fourth scheduler 130, an example fifth scheduler 132, and an example sixth scheduler 134, respectively. Each of the example DSP 120 and the example controller 122 additionally include an example first kernel library 136 and an example second kernel library 138.

In the illustrated example of FIG. 1, the convolution engine 112 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The convolution engine 112 is a device that is configured to improve the processing of tasks associated convolution. Moreover, the convolution engine 112 improves the processing of tasks associated with the analysis of visual imagery and/or other tasks associated with CNNs.

In the example of FIG. 1, the RNN engine 114 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The RNN engine 114 is a device that is configured to improve the processing of tasks associated with RNNs. Additionally, the RNN engine 114 improves the processing of tasks associated with the analysis of unsegmented, connected handwriting recognition, speech recognition, and/or other tasks associated with RNNs.

In the example of FIG. 1, the memory 116 may be implemented by any device for storing data such as, for example, flash memory, magnetic media, optical media, etc. Furthermore, the data stored in the example memory 116 may be in any data format such as, for example, binary data, comma delimited data, tab delimited data, structured query language (SQL) structures, etc. The memory 116 is a shared storage between at least one of the convolution engine 112, the RNN engine 114, the MMU 118, the DSP 120, and the controller 122 including direct memory access (DMA) functionality. Moreover, the memory 116 allows at least one of the convolution engine 112, the RNN engine 114, the MMU 118, the DSP 120, and the controller 122 to access the system memory 102 independent of the host processor 106. In the example of FIG. 1, the memory 116 is a physical storage local to the first accelerator 110a; however, in other examples, the memory 116 may be external to and/or otherwise be remote with respect to the first accelerator 110a. In further examples, the memory 116 may be a virtual storage. In the example of FIG. 1, the memory 116 is a non-volatile storage (e.g., read only memory (ROM), programmable ROM (PROM), erasable PROM (EPROM), electrically erasable PROM (EEPROM), etc.). In other examples, the memory 116 may be a non-volatile basic input/output system (BIOS) or a flash storage. In further examples, the memory 116 may be a volatile memory.

In the illustrated example of FIG. 1, the example MMU 118 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The MMU 118 is a device that includes references to all the addresses of the memory 116 and/or the system memory 102. The MMU 118 additionally translates virtual memory addresses utilized by one or more of the convolution engine 112, the RNN engine 114, the DSP 120, and/or the controller 122 to physical addresses in the memory 116 and/or the system memory 102.

In the example of FIG. 1, the DSP 120 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The DSP 120 is a device that improves the processing of digital signals. For example, the DSP 120 facilitates the processing to measure, filter, and/or compress continuous real-world signals such as data from cameras, and/or other sensors related to computer vision. More generally, the DSP 120 is used to implement, via an example kernel in the first kernel library 136, any workload node from a workload which is not served by other, fixed function CBBs (e.g., the RNN engine 114, a CNN engine, etc.). Furthermore, if a workload includes 100 workload nodes written based on a first language (e.g., TensorFlow, CAFFE, ONNX, etc.), the first accelerator 110a, the second accelerator 110b, and/or the third accelerator 110c may execute 20 workload nodes of the 100 workload nodes as fixed functions (e.g., execute using the RNN engine 114, CNN engine, etc.), and then execute the remaining 80 workload nodes of the 100 workload nodes using a respective kernel in the first kernel library 136. In this manner, any arbitrary based in the same language (e.g., TensorFlow, CAFFE, ONNX, etc.), can be mapped into the first accelerator 110a, the second accelerator 110b, and/or the third accelerator 110c.

In FIG. 1, the controller 122 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The controller 122 is implemented as a control unit of the first accelerator 110a. For example, the controller 122 directs the operation of the first accelerator 110a. In some examples, the controller 122 implements a credit manager. Moreover, the controller 122 can instruct one or more of the convolution engine 112, the RNN engine 114, the memory 116, the MMU 118, and/or the DSP 120 how to respond to machine readable instructions received from the host processor 106.

In the example of FIG. 1, each of the first scheduler 124, the second scheduler 126, the third scheduler 128, the fourth scheduler 130, the fifth scheduler 132, and the sixth scheduler 134 is a device that determines when the convolution engine 112, the RNN engine 114, the memory 116, the MMU 118, the DSP 120, and the controller 122, respectively, executes a portion of a workload that has been offloaded and/or otherwise sent to the first accelerator 110a. Additionally, each of the first kernel library 136 and the second kernel library 138 is a data structure that includes one or more kernels. The kernels of the first kernel library 136 and the second kernel library 138 are, for example, routines compiled for high throughput on the DSP 120 and the controller 122, respectively. The kernels correspond to, for example, executable sub-sections of an executable to be run on the computing system 100.

In examples disclosed herein, each of the convolution engine 112, the RNN engine 114, the memory 116, the MMU 118, the DSP 120, and the controller 122 is in communication with the other elements of the first accelerator 110a. For example, the convolution engine 112, the RNN engine 114, the memory 116, the MMU 118, the DSP 120, and the controller 122 are in communication via an example second communication bus 140. In some examples, the second communication bus 140 may be implemented by one or more computing fabrics (e.g., a configure and control fabric, a data fabric, etc.). In some examples disclosed herein, the convolution engine 112, the RNN engine 114, the memory 116, the MMU 118, the DSP 120, and the controller 122 may be in communication via any suitable wired and/or wireless communication method. Additionally, in some examples disclosed herein, each of the convolution engine 112, the RNN engine 114, the memory 116, the MMU 118, the DSP 120, and the controller 122 may be in communication with any component exterior to the first accelerator 110a via any suitable wired and/or wireless communication method.

As previously mentioned, any of the example first accelerator 110a, the example second accelerator 110b, and/or the example third accelerator 110c may include a variety of CBBs either generic and/or specific to the operation of the respective accelerators. For example, each of the first accelerator 110a, the second accelerator 110b, and the third accelerator 110c includes generic CBBs such as memory, an MMU, a controller, and respective schedulers for each of the CBBs. Additionally or alternatively, external CBBs not located in any of the first accelerator 110a, the example second accelerator 110*b*, and/or the example third accelerator 110*c* may be included and/or added. For example, a user of the computing system 100 may operate an external RNN engine utilizing any one of the first accelerator 110*a*, the second accelerator 110*b*, and/or the third accelerator 110*c*.

While, in the example of FIG. 1, the first accelerator 110*a* implements a VPU and includes the convolution engine 112, the RNN engine 114, and the DSP 120, (e.g., CBBs specific to the operation of specific to the operation of the first accelerator 110*a*), the second accelerator 110*b* and the third accelerator 110*c* may include additional or alternative CBBs specific to the operation of the second accelerator 110*b* and/or the third accelerator 110*c*. For example, if the second accelerator 110*b* implements a GPU, the CBBs specific to the operation of the second accelerator 110*b* can include a thread dispatcher, a graphics technology interface, and/or any other CBB that is desirable to improve the processing speed and overall performance of processing computer graphics and/or image processing. Moreover, if the third accelerator 110*c* implements a FPGA, the CBBs specific to the operation of the third accelerator 110*c* can include one or more arithmetic logic units (ALUs), and/or any other CBB that is desirable to improve the processing speed and overall performance of processing general computations.

While the heterogeneous system 104 of FIG. 1 includes the host processor 106, the first accelerator 110*a*, the second accelerator 110*b*, and the third accelerator 110*c*, in some examples, the heterogeneous system 104 may include any number of processing elements (e.g., host processors and/or accelerators) including application-specific instruction set processors (ASIPs), physic processing units (PPUs), designated DSPs, image processors, coprocessors, floating-point units, network processors, multi-core processors, and front-end processors.

Figure 2:
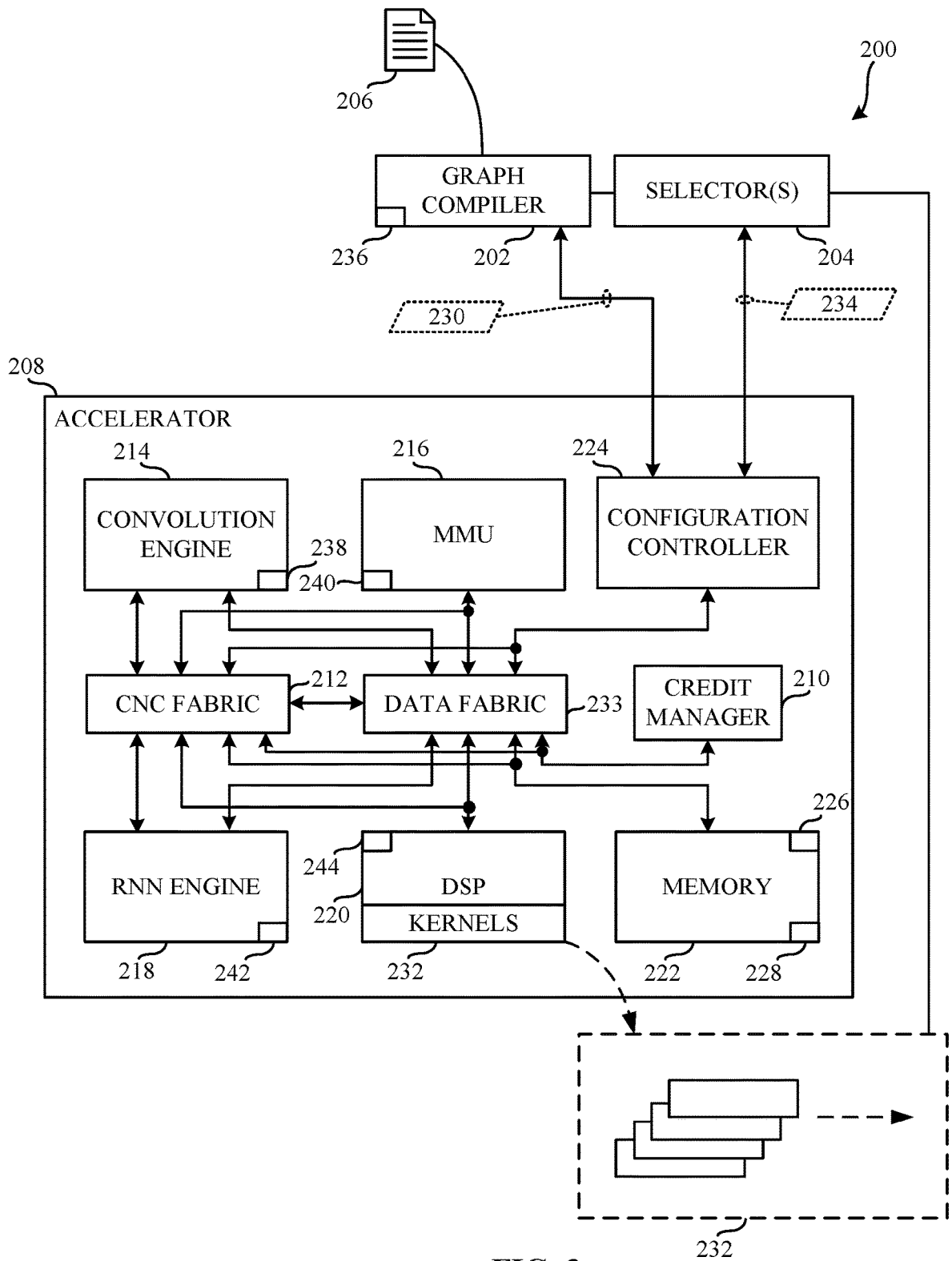
FIG. 2 is a block diagram illustrating an example computing system including an example graph compiler and one or more example selector(s).

FIG. 2 is a block diagram illustrating an example computing system 200 including an example graph compiler 202 and one or more example selector(s) 204. In the example of FIG. 2, the computing system 200 further includes an example workload 206 and an example accelerator 208. Furthermore, in FIG. 2, the accelerator 208 includes an example credit manager 210, an example control and configure (CnC) fabric 212, an example an example convolution engine 214, an example MMU 216, an example RNN engine 218, an example DSP 220, an example memory 222, and an example configuration controller 224. In the example of FIG. 2, the memory 222 includes an example DMA unit 226 and one or more example buffers 228. In other examples disclosed herein, any suitable CBB may be included and/or added into the accelerator 208.

In the illustrated example of FIG. 2, the example graph compiler 202 is a means for compiling, or a compiling means. In the illustrated example of FIG. 2, an example selector of the one or more selector(s) is a means for selecting, or a selecting means. In the illustrated example of FIG. 2, the example credit manager 210 is a means for credit managing, or a credit managing means. In the illustrated example of FIG. 2, the example configuration controller 224 is a means for controlling, or a controlling means. In the example of FIG. 2, any of the convolution engine 214, the MMU 216, the RNN engine 218, the DSP 220, the memory 222, and/or a kernel in the kernel bank 232 may be a means for computing, or a computing means.

In the illustrated example of FIG. 2, the graph compiler 202 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In FIG. 2, the graph compiler 202 is coupled to the one or more selector(s) 204 and to the accelerator 208. In operation, the graph compiler 202 receives the workload 206 and compiles the workload 206 into the example executable file 230 to be executed by the accelerator 208. For example, the graph compiler 202 receives the workload 206 and assigns various workload nodes of the workload 206 (e.g., the graph) to various CBBs (e.g., any of the convolution engine 214, the MMU 216, the RNN engine 218, the DSP 220, and/or the DMA unit 226) of the accelerator 208. The graph compiler 202 further generates an example selector of the one or more selector(s) 204 corresponding to each workload node in the workload 206. Additionally, the graph compiler 202 allocates memory for one or more buffers 228 in the memory 222 of the accelerator 208. In example disclosed herein, the executable file 230 may be generated on a separate system (e.g., a compilation system and/or a compilation processor) and stored for later use on a different system (e.g., deployment system, run time system, deployment processor, etc.). For example, the graph compiler 202 and the one or more selectors 204 may be located on a separate system than the accelerator 208.

In the example illustrated in FIG. 2, the one or more selector(s) 204 is/are implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The one or more selector(s) 204 are coupled to the graph compiler 202, the accelerator 208, and to an example kernel bank 232 located within the DSP 220. The one or more selector(s) 204 are coupled to the graph compiler 202 to obtain the workload 206. Each workload node (e.g., task) in the workload 206 indicates a CBB (e.g., any of the convolution engine 214, the MMU 216, the RNN engine 218, the DSP 220, and/or the DMA unit 226) to be used to execute the associated workload node. In examples disclosed herein, a selector of the one or more selector(s) 204 is generated for each workload node and associated with the corresponding CBB (e.g., any of the convolution engine 214, the MMU 216, the RNN engine 218, the DSP 220, and/or the DMA unit 226) and/or kernels in the kernel bank 232. The one or more selector(s) 204 are generated by the graph compiler 202 in response to the workload 206 and, as such, can identify respective input and/or output conditions of the various CBBs (e.g., any of the convolution engine 214, the MMU 216, the RNN engine 218, the DSP 220, and/or the DMA unit 226) and/or kernels in the kernel bank 232. Such an identification by the one or more selector(s) may be represented as abstracted knowledge for use by the graph compiler 202. Such abstracted knowledge enables the graph compiler 202 to operate independently of the heterogenous nature of the accelerator 208.

In addition, the graph compiler 202 utilizes the one or more selector(s) 204 to map the respective workload node from the workload 206 to the corresponding CBB (e.g., any of the convolution engine 214, the MMU 216, the RNN engine 218, the DSP 220, and/or the DMA unit 226) and/or kernels in the kernel bank 232. Furthermore, the graph compiler 202 utilizes the one or more selector(s) 204 configure the corresponding CBB (e.g., any of the convolution engine 214, the MMU 216, the RNN engine 218, the DSP 220, and/or the DMA unit 226) for the specific operation and parameters per the corresponding workload node and the adjacent workload nodes (e.g., resulting consumers and/or producers of the workload node) with the appropriate amount of credits, etc. In some examples disclosed herein, the one or more selector(s) 204 may map respective workload nodes from the workload 206 to a corresponding CBB (e.g., any of the convolution engine 214, the MMU 216, the RNN engine 218, the DSP 220, and/or the DMA unit 226) and/or kernels in the kernel bank 232

In examples disclosed herein, the one or more selector(s) 204 may be included in the graph compiler 202. In such examples disclosed herein, additional selectors may be included into the one or more selector(s) 204 or, alternatively, current selectors in the one or more selector(s) 204 may be altered in response to changes in the workload 206 and/or accelerator 208 (e.g., a new workload 206 provided, additional CBBs added to the accelerator 208, etc.).

In some examples, the graph compiler 202 identifies a workload node from the workload 206 that indicates that data is to be scaled. Such a workload node indicating data is to be scaled is sent to the one or more selector(s) 204 associated with such a task. The one or more selector(s) 204 associated with the identified workload node can identify the CBB (e.g., any of the convolution engine 214, the MMU 216, the RNN engine 218, the DSP 220, and/or the DMA unit 226) and/or kernel in the kernel bank 232, along with the identified input and/or output conditions of such identified CBB and/or kernel in the kernel bank 232, in order for the graph compiler 202 to execute the workload node.

In the example of FIG. 2, the workload 206 is, for example, a graph, function, algorithm, program, application, and/or other code to be executed by the accelerator 208. In some examples, the workload 206 is a description of a graph, function, algorithm, program, application, and/or other code. The workload 206 may be any arbitrary graph obtained from a user and/or any suitable input. For example, the workload 206 may be a workload related to AI processing, such as a deep learning topology and/or computer vision. In operation, each workload node in the workload 206 (e.g., graph) includes constraints that specify specific CBBs (e.g., any of the convolution engine 214, the MMU 216, the RNN engine 218, the DSP 220, and/or the DMA unit 226), kernels in the kernel bank 232, and/or input and/or output conditions to execute the task in the workload node. Therefore, an example plugin 236 included in the graph compiler 202 enables the mapping between a workload node of the workload 206 (e.g., the graph) and the associated CBB and/or kernel in the kernel bank 232. The plugin 236 interacts with the abstracted knowledge obtained by the one or more selector(s) 204 (e.g., the respective standard input and/or output definitions of each CBB and/or kernel in the kernel bank 232) to assign workload nodes in the workload 206 (e.g., the graph). In such examples disclosed herein, the plugin 236 may form a translation layer between the workload nodes in a workload 206 (e.g., graph) and the various CBBs (e.g., any of the convolution engine 214, the MMU 216, the RNN engine 218, the DSP 220, and/or the DMA unit 226) and/or kernels in the kernel bank 232 to enable mapping of the workload nodes in the workload 206 to the various CBBs (e.g., any of the convolution engine 214, the MMU 216, the RNN engine 218, the DSP 220, and/or the DMA unit 226) and/or kernels in the kernel bank 232 based on the abstracted knowledge obtained by the one or more selector(s) 204 (e.g., the respective standard input and/or output definitions of each CBB and/or kernel in the kernel bank 232).

In the example of FIG. 2, the accelerator 208 is coupled to the graph compiler 202 and to the one or more selector(s) 204. In some examples disclosed herein, during compilation time the graph compiler 202 may operate on a compilation system (e.g., a first processor) and utilize the one or more selector(s) 204 to perform the compilation process (e.g., generate the executable file 230). As a result, the graph compiler 202 generates an example executable file 230 on the compilation system (e.g., a first processor). Additionally or alternatively, the executable file 230 may be stored in a database for later use. For example, the executable file 230 may be stored and executed on the compilation system (e.g., a first processor) and/or any external and/or internal system (e.g., a deployment system, a second processor, etc.). During runtime, the executable file 230 is operable in a deployment system (e.g., the system 100 of FIG. 1, a second processor, etc.). The compilation system (e.g., a first processor) may be operable in a separate location from the deployment system (e.g., the system 100 of FIG. 1, a second processor, etc.). Alternatively, the compilation system and/or the deployment system may be combined and, as such, enable a just in time (JIT) compilation of arbitrary workloads (e.g., the workload 206) into executables (e.g., the executable file 230) that are being executed immediately by the accelerator.

In the illustrated example of FIG. 2, the credit manager 210 is coupled to the CnC fabric 212. The credit manager 210 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device (s) (PLD(s)), field programmable logic device(s) (FPLD(s)), digital signal processor(s) (DSP(s)), etc. The credit manager 210 is a device that manages credits associated with one or more of the convolution engine 214, the MMU 216, the RNN engine 218, and/or the DSP 220. In some examples, the credit manager 210 can be implemented by a controller as a credit manager controller. Credits are representative of data associated with workload nodes that are available in the memory 222 and/or the amount of space available in the memory 222 for the output of the workload node. In another example, credits and/or a credit value may indicate the number of slots in a buffer (e.g., one of the buffers 228) available to store and/or otherwise write data.

The credit manager 210 and/or the configuration controller 224 can partition the memory 222 into one or more buffers (e.g., the buffers 228) associated with each workload node of a given workload based on the executable file 230 received from the graph compiler 202 and distributed by the configuration controller 224. As such, the credits may be representative of slots in the associated buffer (e.g., the buffers 228) available to store and/or otherwise write data. For example, the credit manager 210 receives information corresponding to the workload 206 (e.g., the configure and control messages 234 and/or otherwise configure messages and control messages). For example, the credit manager 210 receives from the configuration controller 224, via the CnC fabric 212, information determined by the configuration controller 224 indicative of the CBBs initialized as a producer and the CBBs initialized a consumer.

In examples disclosed herein, in response to instruction received from the configuration controller 224 (e.g., in response to the configuration controller 224 transmitting the configure and control messages 234) indicating to execute a certain workload node, the credit manager 210 provides and/or otherwise transmits the corresponding credits to the CBB acting as the initial producer (e.g., provides three credits to the convolution engine 214 to write data into three slots of a buffer). Once the CBB acting as the initial producer completes the workload node, the credits are sent back to the point of origin as seen by the CBB (e.g., the credit manager 210). The credit manager 210, in response to obtaining the credits from the producer, provides and/or otherwise transmits the credits to the CBB acting as the consumer (e.g., the DSP 220 obtains three credits to read data from the three slots of the buffer). Such an order of producer and consumers is determined using the executable file 230. In this manner, the CBBs communicate an indication of ability to operate via the credit manager 210, regardless of their heterogenous nature. A producer CBB produces data that is utilized by another CBB whereas a consumer CBB consumes and/or otherwise processes data produced by another CBB.

In some examples disclosed herein, the credit manager 210 may be configured to determine whether an execution of a workload node is complete. In such an example, the credit manager 210 may clear all credits in the CBBs associated with the workload node.

In the example of FIG. 2, the CnC fabric 212 is coupled to the credit manager 210, the convolution engine 214, the MMU 216, the RNN engine 218, the DSP 220, the memory 222, and the configuration controller 224. In some examples disclosed herein, the memory 222 and/or the MMU 216 may be referred to as infrastructure elements and not coupled to the CnC fabric 212. The CnC fabric 212 is a control fabric including a network of wires and at least one logic circuit that allow one or more of the credit manager 210, the convolution engine 214, the MMU 216, the RNN engine 218, and/or the DSP 220 to transmit credits to and/or receive credits from one or more of the credit manager 210, the convolution engine 214, the MMU 216, the RNN engine 218, the DSP 220, the memory 222, and/or the configuration controller 224. In addition, the CnC fabric 212 is configured to transmit example configure and control messages 234 to and/or from the one or more selector(s) 204. In other examples disclosed herein, any suitable computing fabric may be used to implement the CnC fabric 212 (e.g., an Advanced eXtensible Interface (AXI), etc.).

In the illustrated example of FIG. 2, the convolution engine 214 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The convolution engine 214 is coupled to the CnC fabric 212. The convolution engine 214 is a device that is configured to improve the processing of tasks associated convolution. Moreover, the convolution engine 214 improves the processing of tasks associated with the analysis of visual imagery and/or other tasks associated with CNNs.

In the illustrated example of FIG. 2, the example MMU 216 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The MMU 216 is coupled to the CnC fabric 212. The MMU 216 is a device that enables translation of addresses of the memory 222 and/or a memory that is remote with respect to the accelerator 208. The MMU 216 additionally translates virtual memory addresses utilized by one or more of the credit manager 210, the convolution engine 214, the RNN engine 218, and/or the DSP 220 to physical addresses in the memory 222 and/or the memory that is remote with respect to the accelerator 208.

In FIG. 2, the RNN engine 218 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The RNN engine 218 is coupled to the CnC fabric 212. The RNN engine 218 is a device that is configured to improve the processing of tasks associated with RNNs. Additionally, the RNN engine 218 improves the processing of tasks associated with the analysis of unsegmented, connected handwriting recognition, speech recognition, and/or other tasks associated with RNNs.

In the example of FIG. 2, the DSP 220 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The DSP 220 is coupled to the CnC fabric 212. The DSP 220 is a device that improves the processing of digital signals. For example, the DSP 220 facilitates the processing to measure, filter, and/or compress continuous real-world signals such as data from cameras, and/or other sensors related to computer vision.

In the example of FIG. 2, the memory 222 may be implemented by any device for storing data such as, for example, flash memory, magnetic media, optical media, etc. Furthermore, the data stored in the example memory 222 may be in any data format such as, for example, binary data, comma delimited data, tab delimited data, structured query language (SQL) structures, etc. The memory 222 is coupled to the CnC fabric 212. The memory 222 is a shared storage between at least one of the credit manager 210, the convolution engine 214, the MMU 216, the RNN engine 218, the DSP 220, and/or the configuration controller 224. The memory 222 includes the DMA unit 226. Additionally, the memory 222 can be partitioned into the one or more buffers 228 associated with one or more workload nodes of a workload associated with an executable received by the configuration controller 224 and/or the credit manager 210. Moreover the DMA unit 226 of the memory 222 operates in response to commands provided by the configuration controller 224 via the CnC fabric 212. In some examples disclosed herein, the DMA unit 226 of the memory 222 allows at least one of the credit manager 210 the convolution engine 214, the MMU 216, the RNN engine 218, the DSP 220, and/or the configuration controller 224 to access a memory (e.g., the system memory 102) remote to the accelerator 208 independent of a respective processor (e.g., the host processor 106). In the example of FIG. 2, the memory 222 is a physical storage local to the accelerator

208. Additionally or alternatively, in other examples, the memory 222 may be external to and/or otherwise be remote with respect to the accelerator 208. In further examples disclosed herein, the memory 222 may be a virtual storage. In the example of FIG. 2, the memory 222 is a non-volatile storage (e.g., ROM, PROM, EPROM, EEPROM, etc.). In other examples, the memory 222 may be a non-volatile BIOS or a flash storage. In further examples, the memory 222 may be a volatile memory.

In examples disclosed herein, the configuration controller 224 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device (s) (PLD(s)), field programmable logic device(s) (FPLD(s)), digital signal processor(s) (DSP(s)), etc. The configuration controller 224 is implemented as a control unit of the accelerator 208. In examples disclosed herein, the one or more selector(s) 204 transmits the configuration and control messages 234 to the graph compiler 202 in order to generate the executable file 230. In some examples disclosed herein, the configuration controller 224 may obtain and parse the executable file 230 to identify the configuration and control messages (e.g., the configuration and control messages 234 obtained by and/or sent to the one or more selector(s) 204) indicative of the workload nodes included in the executable file 230. As such, the configuration controller 224 provides the configuration and control messages (e.g., the configuration and control messages 234 obtained by and/or sent to the one or more selector(s) 204) to the various CBBs in order to perform the tasks of the executable file 230. In such an example disclosed herein, the configuration and control messages 234 are embedded in the executable file 230 and, as such, provided to the configuration controller 224 and sent to the various CBBs and/or kernels located in the kernel bank 232. For example, the configuration controller 224 parses the executable file 230 to identify the workload nodes in the executable and instructs one or more of the convolution engine 214, the MMU 216, the RNN engine 218, the DSP 220, a kernel in the kernel bank 232, and/or the memory 222 how to respond to the executable file 230 and/or other machine readable instructions received from the graph compiler 202 via the credit manager 210.

In examples disclosed herein, the configuration controller 224 transmits the workload nodes (e.g., in configuration and control message format) from the obtained executable file 230 to the corresponding CBBs identified. Likewise, the configuration controller 224 may transmit the workload nodes (e.g., in configuration and control message format) to the credit manger 210 to initiate distribution of credits.

In the example of FIG. 2, the convolution engine 214, the MMU 216, the RNN engine 218, and/or the DSP 220, respectively, may include respective schedulers 238, 240, 242, and 244. In operation, the schedulers 238, 240, 242, and 244, respectively, execute a portion of the workload 206 (e.g., a workload node) that has been assigned to the convolution engine 214, the MMU 216, the RNN engine 218, and/or the DSP 220, respectively, by the configuration controller 224, the credit manager 210, and/or an additional CBB of the accelerator 208. Depending on the tasks and/or other operations of a given workload node, the workload node can be a producer and/or a consumer.

In the example of FIG. 2, any of the schedulers 238, 240, 242, 244, in response to an indication provided by the credit manager 210, may receive and/or otherwise load into memory a credit value associated with a workload node indicating to write data (e.g., a producer) into a buffer (e.g., at least one of the buffers 228) to the corresponding CBB (e.g., any of the convolution engine 214, the MMU 216, the RNN engine 218, and/or the DSP 220). For example, if the executable file 230 indicates for the RNN engine 218 to act as a producer and write three bits of data into a buffer (e.g., one of the buffers 228), then the scheduler 242 may load three credits values to the RNN engine 218.

Additionally, in such an example, the executable file 230 may indicate to that the MMU 216 is to read the three bits previously written by the RNN engine 218 (e.g., act as a consumer). As such, the scheduler 242 (or the RNN engine 218) transmits the three credits, once used, to the MMU 216 via the CnC fabric 212 and the credit manager 210.

In operation, the scheduler 238, 240, 242, 244 and/or CBB (e.g., any of the convolution engine 214, the MMU 216, the RNN engine 218, and/or the DSP 220) may transmit credits incrementally and/or using any suitable method. In another example, a first CBB may have a first credit value provided to execute a first workload node. In such an example, in response to executing the first workload node, the first CBB writes data to a first buffer (e.g., one of the buffers 228) in the memory 222, transmit a second credit value to a credit manager 210. The second credit value represents an amount of the first credit value used to write data into the first buffer (e.g., one of the buffers 228). For example, if the first credit value is three, and the first CBB writes into two slots of the buffer (e.g., one of the buffers 228), then the first CBB transmits two credits to the credit manager 210. In response, the credit manager 210 transmits the second credit value (e.g., two credits) to a second CBB that utilizes the second credit value (e.g., two credits) to read the data in the two slots of the buffer (e.g., one of the buffers 228). As such, the second CBB can then execute a second workload node. In examples disclosed herein, the buffers 228 are implemented utilizing cyclic buffers that include any suitable number of data slots for use in reading and/or writing data.

In the illustrated example of FIG. 2, the kernel bank 232 is a data structure that includes one or more kernels. The kernels of the kernel bank 232 are, for example, routines compiled for high throughput on the DSP 220. In other examples disclosed herein, each CBB (e.g., any of the convolution engine 214, the MMU 216, the RNN engine 218, and/or the DSP 220) may include a respective kernel bank. The kernels correspond to, for example, executable sub-sections of an executable to be run on the accelerator 208. While, in the example of FIG. 2, the accelerator 208 implements a VPU and includes the credit manager 210, the CnC fabric 212, the convolution engine 214, the MMU 216, the RNN engine 218, the DSP 220, and the memory 222, and the configuration controller 224, the accelerator 208 may include additional or alternative CBBs to those illustrated in FIG. 2. In an additional and/or alternate example disclosed herein, the kernel bank 232 is coupled to the one or more selector(s) 204 to be abstracted for use by the graph compiler 202.

In the example of FIG. 2, the data fabric 233 is coupled to the credit manager 210, the convolution engine 214, the MMU 216, the RNN engine 218, the DSP 220, the memory 222, the configuration controller 224, and the CnC fabric 212. The data fabric 233 is a network of wires and at least one logic circuit that allow one or more of the credit manager 210, the convolution engine 214, the MMU 216, the RNN engine 218, the DSP 220, the memory 222, and/or the configuration controller 224 to exchange data. For example, the data fabric 233 allows a producer CBB to write tiles of data into buffers of a memory, such as the memory 222 and/or the memories located in one or more of the convolution engine 214, the MMU 216, the RNN engine 218, and the DSP 220. Additionally, the data fabric 233 allows a consuming CBB to read tiles of data from buffers of a memory, such as the memory 222 and/or the memories located in one or more of the convolution engine 214, the MMU 216, the RNN engine 218, and the DSP 220. The data fabric 233 transfers data to and from memory depending on the information provided in the package of data. For example, data can be transferred by methods of packets, wherein a packet includes a header, a payload, and a trailer. The header of a packet is the destination address of the data, the source address of the data, the type of protocol the data is being sent by, and a packet number. The payload is the data the a CBB produces or consumes. The data fabric 233 may facilitate the data exchange between CBBs based on the header of the packet by analyzing an intended destination address. In some examples disclosed herein, the data fabric 233 and the CnC fabric 212 may be implemented using a single and/or using multiple computing fabrics.

Figure 3:
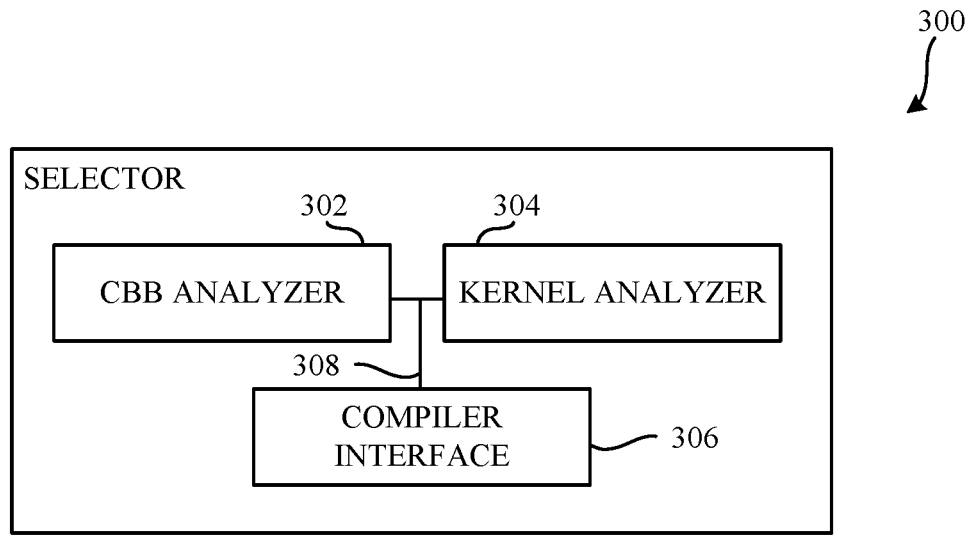
FIG. 3 is an example block diagram illustrating an example selector of the one or more selector(s) of FIG. 2.

FIG. 3 is an example block diagram illustrating an example selector 300 of the one or more selector(s) 204 of FIG. 2. The selector 300 represents an example selector generated by the graph compiler 202 of FIG. 2 for a specific workload node. In such an example, the selector 300 may be generated to communicate with a specific CBB (e.g., any of the convolution engine 214, the MMU 216, the RNN engine 218, and/or the DSP 220) and/or a kernel in the kernel bank 232 of FIG. 2. The selector 300 may be implemented for an individual workload node in the workload 206 of FIG. 2. Additionally, individual selectors may be implemented for each individual workload node in the workload 206. The selector 300 illustrated in FIG. 3 includes an example CBB analyzer 302, an example kernel analyzer 304, and an example compiler interface 306. In operation, any of the CBB analyzer 302, the kernel analyzer 304, and/or the compiler interface 306 may communicate via an example communication bus 308. In FIG. 3, the communication bus 308 may be implemented using any suitable communication method and/or apparatus (e.g., Bluetooth® communication, LAN communication, WLAN communication, etc.). In some examples disclosed herein, the selector 300 illustrates an example selector of the one or more selector(s) 204 and may be included in the graph compiler 202 of FIG. 2.

In the example illustrated in FIG. 3, the CBB analyzer 302 is a means for compute element analyzing, or a compute element analyzing means. In the example of FIG. 3, the kernel analyzer 304 is a means for kernel analyzing, or a kernel analyzing means. In the example of FIG. 3, the compiler interface 306 is a means for compiler communication, or a compiler communication means.

In the example illustrated in FIG. 3, the CBB analyzer 302 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In operation, the CBB analyzer 302 is configured to identify input and output conditions of a CBB (e.g., any of the convolution engine 214, the MMU 216, the RNN engine 218, and/or the DSP 220) associated with a workload node. The CBB analyzer 302 of FIG. 3 is configured to identify the types of input conditions that correspond to standard input requirements (e.g., data structures, number of inputs, etc.), and are associated with the CBB identified to execute the workload node. In addition, the CBB analyzer 302 is configured to identify the types of output conditions that correspond to a standard result (e.g., number outputs, type of result, etc.), and are associated with the CBB identified to execute the workload node. In this manner, the identified input and output conditions are identified by the CBB analyzer 302 and provided in a standard format for use by the graph compiler 202.

In another example disclosed herein, the CBB analyzer 302 may communicate with the associated CBB to identify operating requirements. For example, if a CBB requires a certain percentage of memory allocation to execute an example workload node, such a requirement can be determined by the CBB analyzer 302 and transmitted to the graph compiler 202 via the compiler interface 306.

In some examples disclosed herein, the CBB analyzer 302 indirectly communicates with the associated CBB by utilizing internal knowledge and/or present and/or prior modeling of the associated CBB. Example internal knowledge and/or present and/or prior modeling may include knowledge of the CBB operating requirements. Furthermore, the CBB analyzer 302 may perform node analysis on the associated workload node to identify the node type. Such example analysis may be performed utilizing a node analyzer located in the selector 300. Further in such an example, the identified node type may be communicated, provided, and/or otherwise utilized by the graph compiler 202. In this manner, the selector 300 obtains knowledge about the corresponding CBB and/or CBBs that may be the target for mapping the corresponding workload node. For example, there may be a workload node identifying to perform multiplication. As such, the graph compiler 202 of FIG. 2 may call and/or otherwise communicate with the selector 300 that have knowledge about multiplication (e.g., based on analyzing the identified node types) and provide relevant parameters of the workload node to the selector 300. The CBB analyzer 302 of the selector 300 would identify the CBB to execute the workload node for use in mapping. In some examples disclosed herein, the CBB analyzer 302 may map the corresponding workload node to the corresponding CBB.

In FIG. 3, the example kernel analyzer 304 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In operation, the kernel analyzer 304 is configured to identify input and output conditions of a kernel (e.g., a kernel included in the kernel bank 232 of FIG. 2). For example, the kernel analyzer 304 is configured to identify the types of input conditions that correspond to standard input requirements (e.g., data structures, number of inputs, etc.), and are associated with the kernel identified to execute the workload node. In addition, the kernel analyzer 304 is configured to identify the types of output conditions that correspond to a standard result (e.g., number outputs, type of result, etc.), and are associated with the kernel identified to execute the workload node. In this manner, the identified input and output conditions are provided in a standard format for use by the graph compiler 202. In examples disclosed herein, the kernel analyzer 304 may identify the types of input and/or output conditions of any kernel that is included in the accelerator 208 (e.g., a new kernel downloaded onto the accelerator, etc.).

In another example disclosed herein, the kernel analyzer 304 may communicate with the associated kernel to identify operating requirements. For example, if a kernel requires a certain percentage of memory allocation to execute an example workload node, such a requirement can be determined by the kernel analyzer 304 and transmitted to the graph compiler 202 via the compiler interface 306.

In some examples disclosed herein, the kernel analyzer 304 indirectly communicates with the associated kernels by utilizing internal knowledge and/or present and/or prior modeling of the associated kernel. Example internal knowledge and/or present and/or prior modeling may include knowledge of the kernel operating requirements. Furthermore, the kernel analyzer 304 may perform node analysis on the associated workload node to identify the node type. Such example analysis may be performed utilizing a node analyzer located in the selector 300. Further in such an example, the identified node type may be communicated, provided, and/or otherwise utilized by the graph compiler 202. For example, there may be a workload node identifying to perform multiplication. As such, the graph compiler 202 of FIG. 2 may call and/or otherwise communicate with the selector 300 that have knowledge about multiplication (e.g., based on the identified node types) and provide relevant parameters of the workload node to the selector 300. The kernel analyzer 304 of the selector 300 would identify the kernel to execute the workload node for use in mapping. In some examples disclosed herein, the kernel analyzer 304 may map the corresponding workload node to the corresponding kernel.

In examples disclosed herein, any of the CBB analyzer 302 and/or the kernel analyzer 304 may communicate identified constraints and/or requirements to the graph compiler 202 via the compiler interface 306.

In the example illustrated in FIG. 3, the compiler interface 306 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In some examples disclosed herein, the compiler interface 306 may be implemented using a software application programming interface (API) executable on hardware circuitry. Such an example compiler interface 306 enables communication between the selector 300 and the graph compiler 202 of FIG. 2. In addition, the compiler interface 306 may be implemented by any type of interface standard, such as an Ethernet interface, a universal serial bus (USB), a Bluetooth® interface, a near field communication (NFC) interface, and/or a PCI express interface. The compiler interface 306 is configured to obtain the input and output conditions from either the CBB analyzer 302 and/or the kernel analyzer 304 and transmit the input and output conditions to the graph compiler 202. Additionally or alternatively, the compiler interface 306 may be configured to transmit the requirements determined by the CBB analyzer 302 and/or the kernel analyzer 304 to the graph compiler 202.

Figure 4:
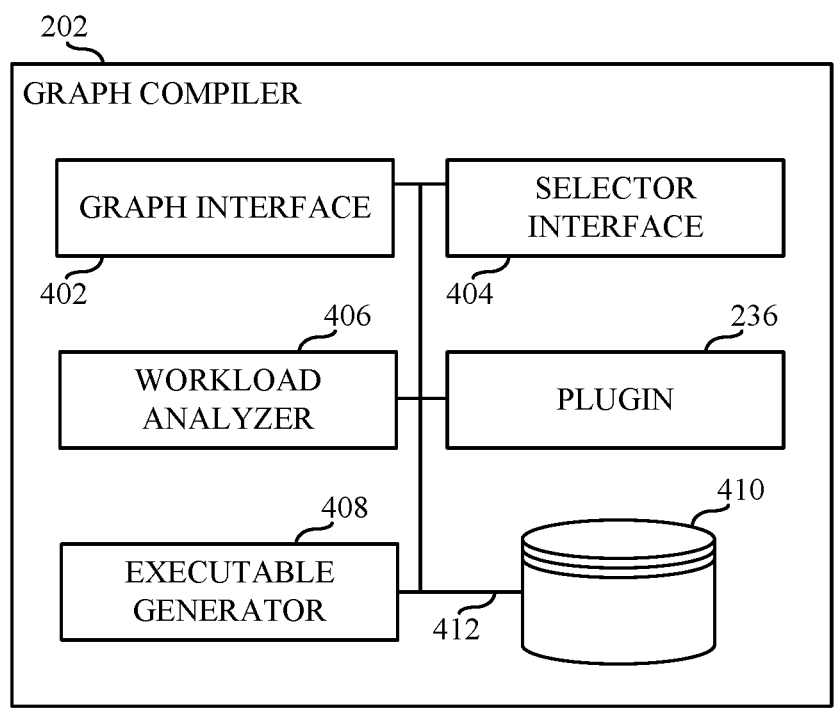
FIG. 4 is an example block diagram illustrating the graph compiler of FIG. 2.

FIG. 4 is an example block diagram illustrating the graph compiler 202 of FIG. 2. The graph compiler 202, as illustrated in FIG. 4, includes an example graph interface 402, an example selector interface 404, an example workload analyzer 406, an example executable generator 408, an example datastore 410, and the plugin 236 of FIG. 2. In operation, any of the graph interface 402, the selector interface 404, the workload analyzer 406, the executable generator 408, the datastore 410, and/or the plugin 236 may communicate via an example communication bus 412. In FIG. 4, the communication bus 412 may be implemented using any suitable communication method and/or apparatus (e.g., Bluetooth® communication, LAN communication, WLAN communication, etc.).

In the example illustrated in FIG. 4, the graph interface 402 is a means for graph communication, or a graph communication means. In the example of FIG. 4, the selector interface 404 is a means for selector communication, or a selector communication means. In the example illustrated in FIG. 4, the workload analyzer 406 is a means for workload analyzing, or a workload analyzing means. In the example of FIG. 4, the plugin 236 is a means for translating, or a translation means. In the example of FIG. 4, the executable generator 408 is a means for executable generation, or an executable generating means. In the example of FIG. 4, the datastore 410 is a means for storing data, or a data storing means.

In the example illustrated in FIG. 4, the graph interface 402 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In addition, the graph interface 402 may be implemented by any type of interface standard, such as an Ethernet interface, a universal serial bus (USB), a Bluetooth® interface, a near field communication (NFC) interface, and/or a PCI express interface. The graph interface 402 is configured to determine whether a workload (e.g., the workload 206 of FIG. 2) is received. In examples disclosed herein, if the workload 206 is available, the graph interface 402 may store the workload 206 in the datastore 410.

In FIG. 4, the example selector interface 404 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In addition, the selector interface 404 may be implemented by any type of interface standard, such as an Ethernet interface, a universal serial bus (USB), a Bluetooth® interface, a near field communication (NFC) interface, and/or a PCI express interface. The selector interface 404 is configured to, in response to obtaining the workload 206, generate and/or otherwise provide the one or more selector(s) 204 for each workload node in the workload 206. Additionally, the selector interface 404 is configured to obtain and/or otherwise receive the input and/or output conditions from the one or more selector(s) 204. For example, the selector interface 404 is configured to obtain the input and output conditions of each CBB (e.g., any of the convolution engine 214, the MMU 216, the RNN engine 218, and/or the DSP 220) in the accelerator 208. In such an operation, the selector interface 404 obtains a generic list of CBBs in which the list specifies input and output conditions to operate the CBBs. In another example, the selector interface 404 is configured to obtain the input and output conditions of each kernel (e.g., any kernel in the kernel bank 232 and/or any suitable kernel) in the accelerator 208. In such an operation, the selector interface 404 obtains a generic list of kernels in which the list specifies input and output conditions to operate the kernels. In operation, the selector interface 404 stores the input and/or output conditions identified by the one or more selector(s) 204 in the datastore 410.

In the example illustrated in FIG. 4, the workload analyzer 406 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The workload analyzer 406 parses the workload nodes included in the workload (e.g., the workload 206 of FIG. 6). The workload analyzer 406 parses the workload nodes to identify the input and output conditions used to execute the workload nodes. The workload analyzer 406 may transmit the parsed workload nodes to the selector interface 404 for use by the one or more selector(s) 204 and/or the datastore 410 for use by the plugin 236.

In the example of FIG. 4, the plugin 236 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In operation, the plugin 236 is configured to communicate with the selector interface 404, the workload analyzer 406, and the data stored in the datastore 410 to map a workload node identified by the workload analyzer 406 to a CBB (e.g., any of the convolution engine 214, the MMU 216, the RNN engine 218, and/or the DSP 220). For example, the plugin 236 maps and/or otherwise assigns a workload node to a CBB and/or kernel in the accelerator 208 based on the identified input and/or output conditions. Further in such an example, the plugin 236 obtains the input and/or output conditions to implement the workload node and assigns such a workload node to be executed based on a device (e.g., any of the any of the convolution engine 214, the MMU 216, the RNN engine 218, the DSP 220, and/or kernels located in the kernel bank 232) that likewise includes the same, or substantially similar, input and/or output conditions. In this manner, the plugin 236 does not have direct knowledge of the specific device (e.g., any of the convolution engine 214, the MMU 216, the RNN engine 218, the DSP 220, and/or kernels located in the kernel bank 232) that is being assigned the workload node.

In some examples disclosed herein, the plugin 236 may be implemented using a suitable AI technology to learn from and/or predict which CBB and/or kernel can be assigned a specific workload node. For example, if the plugin 236 has previously assigned a workload node indicating to backup data to a specific CBB, if such a workload node were to be assigned in the future, the plugin 236 may assign it to the specific CBB independent of analyzing the data stored in the datastore 410.

In FIG. 4, the example executable generator 408 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. After the plugin 236 assigns the workload nodes to a device that includes similar input and/or output conditions, the executable generator 408 is configured to generate the executable file 230 of FIG. 2 to be executed by the accelerator 208. The executable generator 408 further transmits the executable file 230 to the configuration controller 224. In addition, the executable generator 408 may generator one or more executables to be executed by the accelerator 208.

In the example illustrated in FIG. 4, the datastore 410 may be implemented by any device for storing data such as, for example, flash memory, magnetic media, optical media, etc. Furthermore, the data stored in the example datastore 410 may be in any data format such as, for example, binary data, comma delimited data, tab delimited data, structured query language (SQL) structures, etc. In FIG. 4, the datastore 410 is configured to store the input and/or output conditions obtained from the selector interface 404, the workload (e.g., the workload 206 of FIG. 2) obtained from the graph interface 402, and/or the input and/or output conditions to execute a workload node (e.g., the input and/or output conditions identified by the workload analyzer 406). The datastore 410 may be written to and/or read from by any of the graph interface 402, the selector interface 404, the workload analyzer 406, the plugin 236, and/or the executable generator 408.

Figure 5:
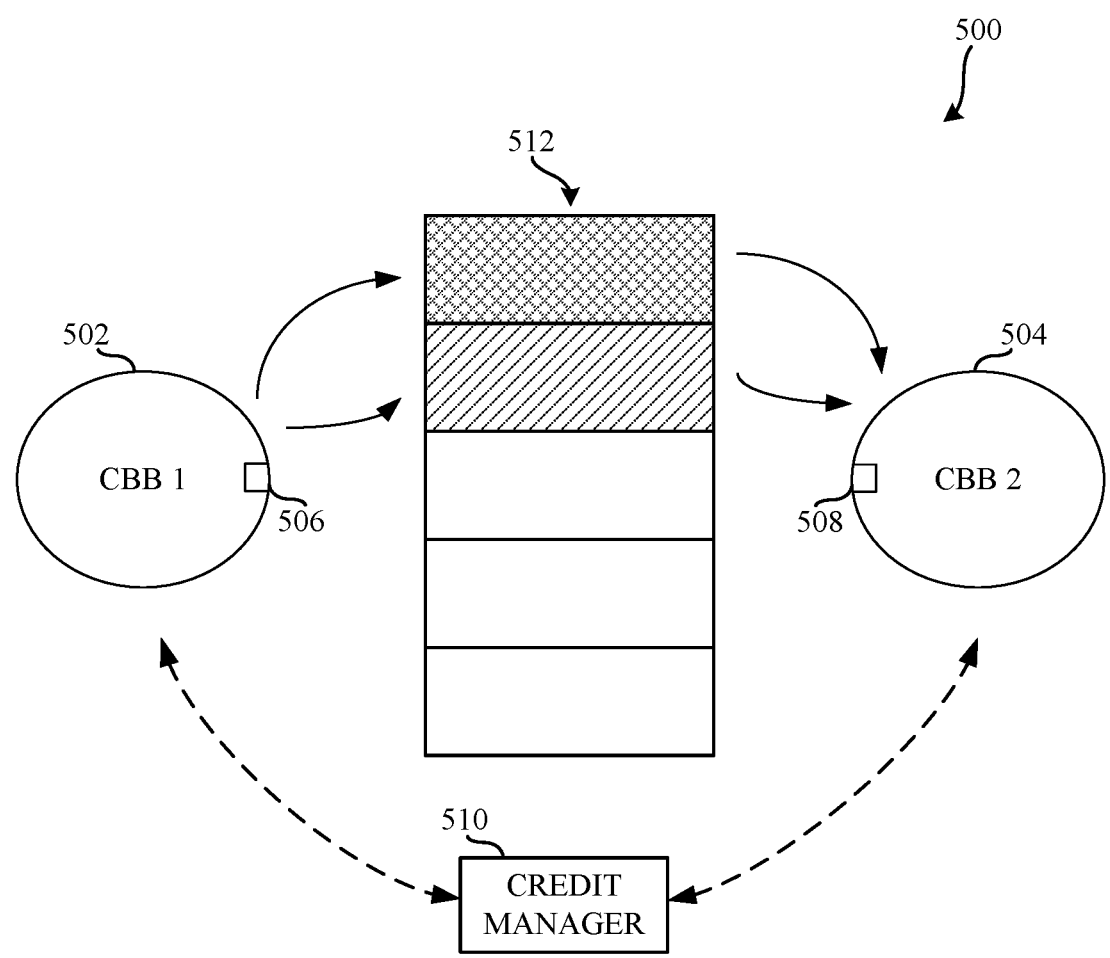
FIG. 5 is a graphical illustration of an example pipeline representative of a workload executed using an example first CBB and an example second CBB.

FIG. 5 is a graphical illustration of an example pipeline 500 representative of a workload executed using an example first CBB 502 and an example second CBB 504. The first CBB 502 and/or the second CBB 504 may be an example CBB of FIG. 1 (e.g., any of the convolution engine 214, the MMU 216, the RNN engine 218, and/or the DSP 220). Alternatively, the first CBB 502 and/or the second CBB 504 may be implemented using any suitable kernel (e.g., a kernel located in the kernel bank 232). In the example of FIG. 5, the first CBB 502 is a producer and the second CBB 504 is a consumer. The example pipeline 500 includes an example first workload node 506, and an example second workload node 508. In the example of FIG. 5, the first CBB 502 is configured to execute the first workload node 506. Likewise, the second CBB 504 is configured to execute the second workload node 508. In operation, an example credit manager 510 is configured to provide a first credit value to the first CBB 502 in order to execute the first workload node 506. For example, the first credit value is five credits (e.g., the data slot availability initially in the buffer 512) and, as such, provide the first CBB 502 with an indication to begin execution of the first workload node 506. In FIG. 5, the buffer 512 is a cyclic buffer.

In the example illustrated in FIG. 5, the first workload node 506 is executed by writing to two slots (e.g., a subset of data slots) of the buffer 512. As such, the first CBB 502 writes to the first two available slots of the buffer 512. In response, the first CBB 502 transmits two credits to the credit manager 510. The credit manager 510 transmits, once available, the two credits to the second CBB 504. The two credits provided to the second CBB 504 operate to indicate to the second CBB 504 begin execution of the second workload node 508. In FIG. 5, the second workload node 508 is executed by reading, on a first-in first-out (FIFO) basis, the next two slots in the buffer 512.

While an example manner of implementing the example graph compiler 202, the example one or more selector(s)

204, the example selector 300 and/or the accelerator 208 of FIG. 2 is illustrated in FIGS. 3 and/or 4, one or more of the elements, processes and/or devices illustrated in FIGS. 2, 3, and/or 4 may be combined, divided, re-arranged, omitted, eliminated and/or implemented in any other way. Further, the example CBB analyzer 302, the example kernel analyzer 304, the example compiler interface 306, and/or, more generally, the example selector 300 and/or the example one or more selector(s) 204 of FIGS. 2 and/or 3, the example graph interface 402, the example selector interface 404, the example workload analyzer 406, the example executable generator 408, the example datastore 410, the example plugin 236, and/or, more generally, the example graph compiler 202 of FIGS. 2 and/or 4, and/or the example credit manager 210, the example CnC fabric 212, the example convolution engine 214, the example MMU 216, the example RNN engine 218, the example DSP 220, the example memory 222, the example configuration controller 224, the example kernel bank 232, and/or, more generally, the example accelerator 208 of FIG. 2 may be implemented by hardware, software, firmware and/or any combination of hardware, software and/or firmware. Thus, for example, any of the example CBB analyzer 302, the example kernel analyzer 304, the example compiler interface 306, and/or, more generally, the example selector 300 and/or the example one or more selector(s) 204 of FIGS. 2 and/or 3, the example graph interface 402, the example selector interface 404, the example workload analyzer 406, the example executable generator 408, the example datastore 410, the example plugin 236, and/or, more generally, the example graph compiler 202 of FIGS. 2 and/or 4, and/or the example credit manager 210, the example CnC fabric 212, the example convolution engine 214, the example MMU 216, the example RNN engine 218, the example DSP 220, the example memory 222, the example configuration controller 224, the example kernel bank 232, and/or, more generally, the example accelerator 208 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example CBB analyzer 302, the example kernel analyzer 304, the example compiler interface 306, and/or, more generally, the example selector 300 and/or the example one or more selector(s) 204 of FIGS. 2 and/or 3, the example graph interface 402, the example selector interface 404, the example workload analyzer 406, the example executable generator 408, the example datastore 410, the example plugin 236, and/or, more generally, the example graph compiler 202 of FIGS. 2 and/or 4, and/or the example credit manager 210, the example CnC fabric 212, the example convolution engine 214, the example MMU 216, the example RNN engine 218, the example DSP 220, the example memory 222, the example configuration controller 224, the example kernel bank 232, and/or, more generally, the example accelerator 208 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example graph compiler 202, the example one or more selector(s) 204, the example selector 300, and/or the accelerator 208 of FIGS. 2, 3, and/or 4 may include one or more elements, processes and/or devices in addition to, or instead of, those illustrated in FIGS. 2, 3, and/or 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
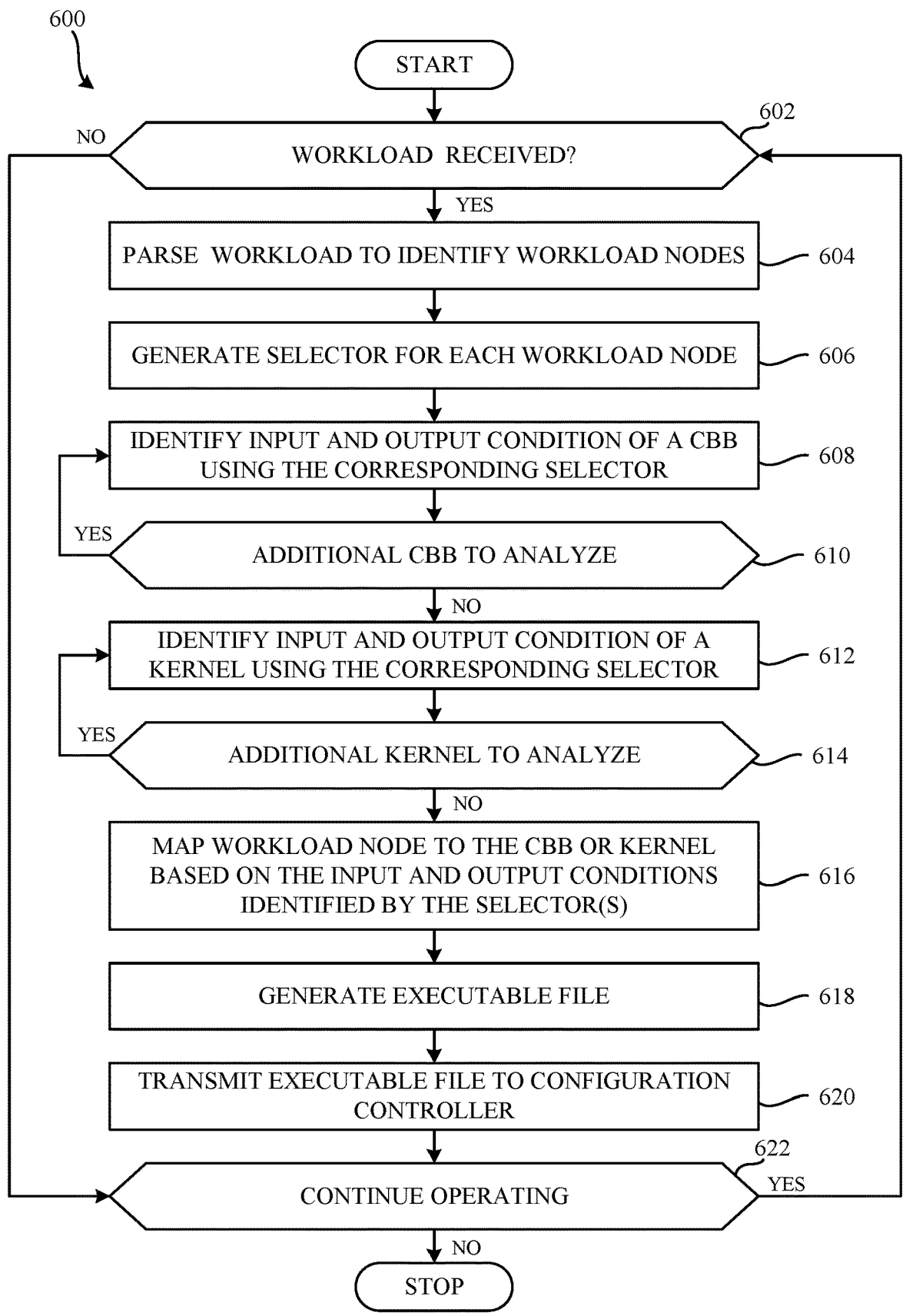
FIG. 6 is a flowchart representative of a process that may be executed to implement the graph compiler, the selector, and/or the one or more selector(s) of FIGS. 2, 3, and/or 4 to generate the executable of FIG. 2.

Flowcharts representative of example hardware logic, machine readable instructions, hardware implemented state machines, and/or any combination thereof for implementing the example graph compiler 202, the example one or more selector(s) 204, the example selector 300, and/or the accelerator 208 is shown in FIGS. 6 and/or 7. The machine readable instructions may be one or more executable programs or portion(s) of an executable program for execution by a computer processor such as the processor 810 and/or the accelerator 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 810 and/or the accelerator 812, but the entire program and/or parts thereof could alternatively be executed by a device other than the processor 810, accelerator 812, and/or embodied in firmware or dedicated hardware. Further, although the example program is described with reference to the flowchart illustrated in FIG. 4, many other methods of implementing the example graph compiler 202, the example one or more selector(s) 204, the example selector 300, and/or the accelerator 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 6 and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of a process 600 that may be executed to implement the graph compiler 202, the selector 300, and/or the one or more selector(s) 204 of FIGS. 2, 3, and/or 4 to generate the executable file 230 of FIG. 2. In the illustrated example of FIG. 6, the graph interface 402 (FIG. 4) determines whether the workload 206 is received and/or otherwise available. (Block 602). In response to the graph interface 402 determining the workload 206 is not received and/or otherwise available (e.g., the control of block 602 returns a result of NO), the process 600 continues to wait. Alternatively, if the graph interface 402 determines a workload 206 is received and/or otherwise available (e.g., the control of block 602 returns a result of YES), then the workload analyzer 406 (FIG. 4) parses the workload 206 to identify the workload nodes. (Block 604).

In response, the selector interface 404 (FIG. 4) generates a selector (e.g., the one or more selector(s) 204 of FIG. 2) for each workload node. (Block 606). The CBB analyzer 302 (FIG. 3) further obtains and/or otherwise identifies the input and output conditions of the associated CBB. (Block 608). In response, the selector interface 404 determines whether all selector(s) generated have provided respective input and/or output conditions and, as such, determine whether there are additional CBBs to analyze. (Block 610). If the selector interface 404 determines there are additional CBBs to analyze (e.g., the control of block 610 returns a result of YES), then control returns to block 608. Alternatively, if the selector interface 404 determines there are no additional CBBs to analyze (e.g., the control of block 610 returns a result of NO), then the kernel analyzer 304 (FIG. 3) further obtains and/or otherwise identifies the input and output conditions of the associated kernel. (Block 612). In response, the selector interface 404 determines whether all selector(s) generated have provided respective input and/or output conditions and, as such, determine whether there are additional kernels to analyze. (Block 614). If the selector interface 404 determines there are additional kernels to analyze (e.g., the control of block 614 returns a result of YES), then control returns to block 612. Alternatively, if the selector interface 404 determines there are no additional kernels to analyze (e.g., the control of block 614 returns a result of NO), then the plugin 236 (FIGS. 2 and/or 4) maps the workload nodes to a CBB and/or kernel based on the input and output conditions identified by the selector(s) (e.g., the one or more selector(s) 204 of FIG. 2). (Block 616).

The executable generator 408 (FIG. 4) then generates the executable file 230. (Block 618). The executable generator 408 further transmits the executable file 230 to the configuration controller 224. (Block 620). In another example disclosed herein, in response to the execution of block 618, the executable generator 408 may store the executable file 230 in the datastore 410 for later use in an external and/or internal deployment system (e.g., the system 100 of FIG. 1). In the illustrated example of FIG. 6, the graph compiler 202 determines whether to continue operating. (Block 622). In the event the graph compiler 202 determines to continue operating (e.g., the control of block 622 returns a result of YES), then control returns to block 602 in which the graph interface 402 determines whether the workload 206 is received and/or otherwise available. For example, the graph compiler 202 may determine to continue operating if additional workloads are available and/or if new CBBs and/or kernels are included in the accelerator 208.

Alternatively, if the graph compiler 202 determines that operation is to not continue (e.g., the control of block 622 returns a result of NO), then the process 600 of FIG. 6 terminates. That is, the process 600 may stop in the event no more workloads are available.

Figure 7:
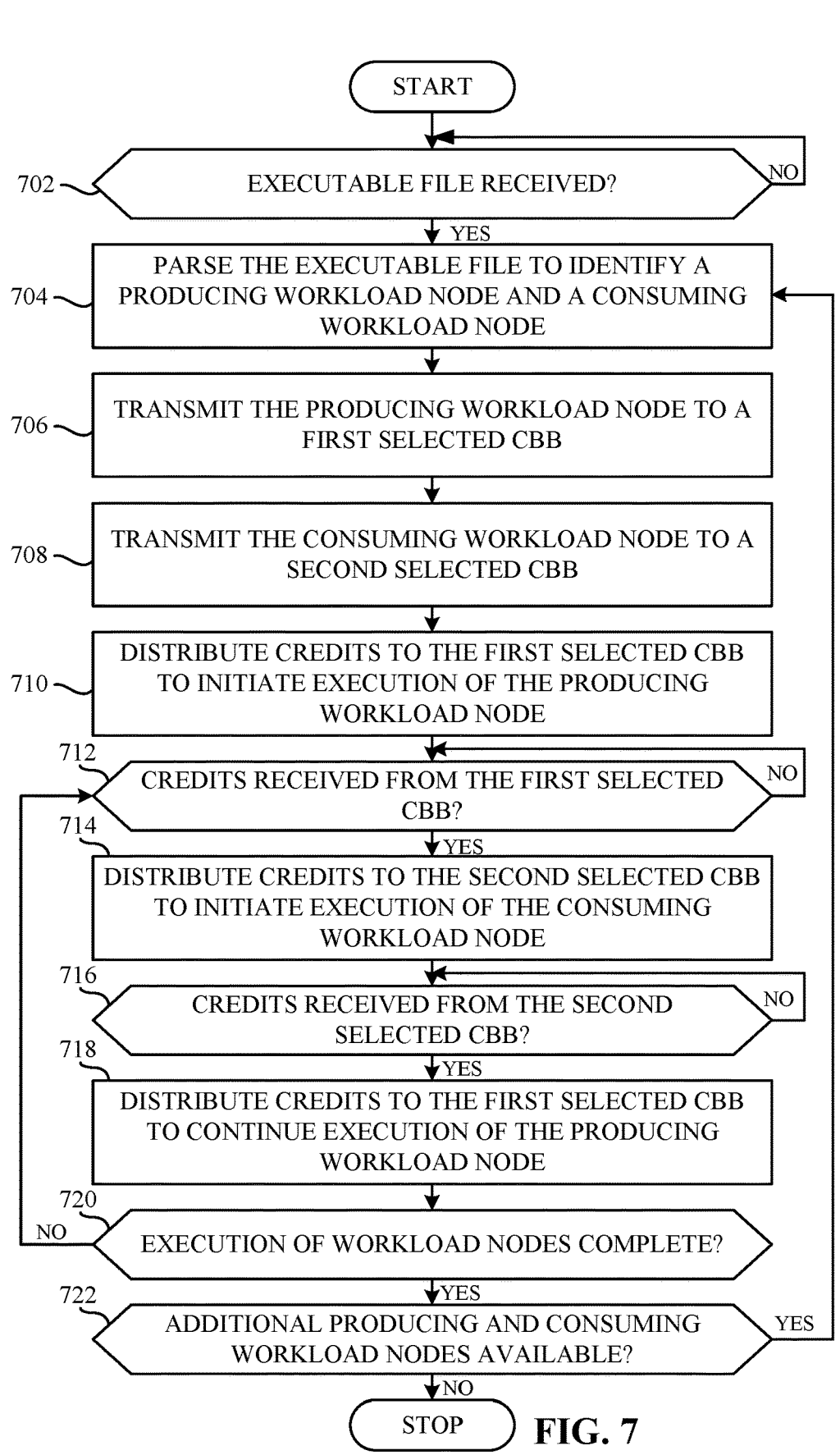
FIG. 7 is a flowchart representative of a process that may be executed to implement the credit manager and/or the configuration controller of FIG. 2 to facilitate execution of the executable of FIG. 2.

FIG. 7 is a flowchart representative of a process 700 that may be executed to implement the credit manager 210 and/or the configuration controller 224 of FIG. 2 to facilitate execution of the executable file 230 of FIG. 2. In FIG. 7, the configuration controller 224 (FIG. 2) determines whether the executable file 230 is received and/or otherwise available from the graph compiler 202. (Block 702). If the configuration controller 224 determines the executable file 230 is not received and/or otherwise not available (e.g., the control of block 702 returns a result of NO), then the process 700 continues to wait. Alternatively, if the configuration controller 224 determines the executable file 230 is received and/or otherwise available (e.g., the control of block 702 returns a result of YES), then the configuration controller 224 parses the executable file 230 to identify a producing workload node and a consuming workload node in order to identify the respective CBBs to execute the producing and consuming workload nodes. (Block 704). In response, the configuration controller 224 transmits the producing workload node to a first selected CBB (e.g., the convolution engine 214). (Block 706). Likewise, the configuration controller 224 transmits the consuming workload node to a second selected CBB (e.g., the DSP 220). (Block 708).

In response to or in parallel to, the credit manager 210 distributes credits to the first selected CBB (e.g., the convolution engine 214) to initiate execution of the production workload node. (Block 710). In some examples disclosed herein, the operation of blocks 706, 708, and/or 710 may operate with respect to all producing workload nodes and/or consuming workload nodes. For example, the credit manager 210 may distribute credits corresponding to all producing workload nodes to all corresponding producing CBB's. In such an example, synchronization during runtime is achieved based on communication among the corresponding CBBs and/or the credit manager 210. Since the credits are sent to and from the credit manager 210, the credit manager 210 determines whether credits are received from the first selected CBB (e.g., the convolution engine 214). (Block 712). If the credit manager 210 determines that credits have not been obtained nor sent from the first selected CBB (e.g., the convolution engine 214) (e.g., the control of block 712 returns a result of NO), then the process 700 continues to wait. Alternatively, if the credit manager 210 determines that credits have been obtained and/or sent from the first selected CBB (e.g., the convolution engine 214) (e.g., the control of block 712 returns a result of YES), then credit manager 210 distributes credits to the second selected CBB (e.g., the DSP 220) to initiate execution of the consuming workload node. (Block 714).

In response, the credit manager 210 determines whether credits are received from the second selected CBB (e.g., DSP 220). (Block 716). If the credit manager 210 determines that credits have not been obtained nor sent from the second selected CBB (e.g., the DSP 220) (e.g., the control of block 716 returns a result of NO), then the process 700 continues to wait. Alternatively, if the credit manager 210 determines that credits have been obtained and/or sent from the second selected CBB (e.g., the DSP 220) (e.g., the control of block 716 returns a result of YES), then credit manager 210 distributes credits to the first selected CBB (e.g., the convolution engine 214) to continue execution of the producing workload node. (Block 718).

The credit manager 210 determines whether execution of the workload nodes (e.g., the producing workload node or the consuming workload node) is complete. (Block 720). In some examples disclosed herein, the credit manager 210 may determine whether execution of the workload nodes is complete based on counting the generated credits for the buffers. For example, the credit manager 210 may know from the executable file 230 that the CBB acting as a producer (e.g., the first CBB 502 of FIG. 5) is to generate 50 credits while executing and/or otherwise processing the corresponding workload node. Therefore, the credit manager 210 may determine execution of the workload nodes is complete in response to obtaining and/or otherwise receiving 50 credits from the producing workload node (e.g., the first CBB 502). If the credit manager 210 determines that execution of the workload nodes (e.g., the producing workload node or the consuming workload node) is not complete (e.g., the control of block 720 returns a result of NO), then control returns to block 712 in which the credit manager 210 determines whether credits are received from the first selected CBB (e.g., the convolution engine 214). In another example disclosed herein, if the credit manager determines that the execution of the workload nodes (e.g., the producing workload node or the consuming workload node) is not complete (e.g., the control of block 720 returns a result of NO), and that the execution of the producing workload node is complete, then control may proceed to block 714 in order to complete execution of the consuming workload node.

Alternatively, if the credit manager 210 determines that the execution of the workload nodes (e.g., the producing workload node or the consuming workload node) is complete (e.g., the control of block 720 returns a result of YES), then the configuration controller 224 determines whether additional producing and consuming workload nodes are available. (Block 722). If the configuration controller 224 determines that additional producing and consuming workload nodes are available (e.g., the control of block 722 returns a result of YES), the control returns to block 704. Alternatively, if the configuration controller 224 determines that there are not additional producing or consuming workload nodes available (e.g., the control of block 722 returns a result of NO), then the process 700 stops.

Figure 8:
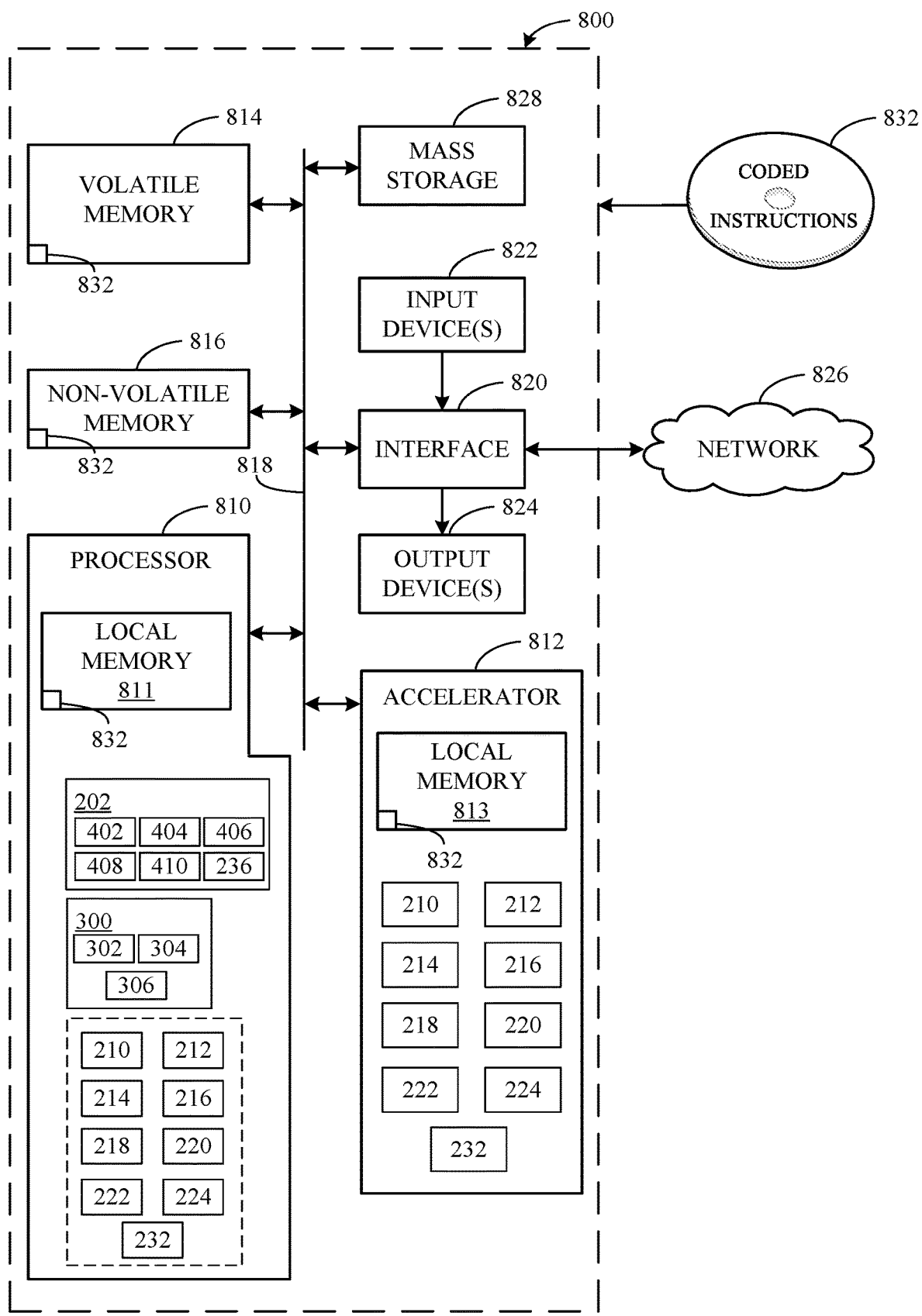
FIG. 8 is a block diagram of an example processor platform structured to execute the instructions of FIGS. 6 and/or 7 to implement the example graph compiler, the example one or more selector(s), the example selector, and/or the accelerator of FIGS. 2, 3, and/or 4.

FIG. 8 is a block diagram of an example processor platform 800 (e.g., a coupled compilation and deployment system) structured to execute the instructions of FIGS. 6 and/or 7 to implement the example graph compiler 202, the example one or more selector(s) 204, the example selector 300, and/or the accelerator 208 of FIGS. 2, 3, and/or 4. Alternatively, in some examples disclosed herein, the example graph compiler 202, the example one or more selector(s) 204, and/or the example selector 300 may be operable on a separate compilation system (e.g., a compilation processor) structured to execute the instructions of FIG. 6 than the example accelerator 208. In such example decoupled system operation, the accelerator 208 may be operable to execute an executable file on a separate deployment system (e.g., a deployment processor) structured to execute the instructions of FIG. 7 than the compilation system. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, a headset or other wearable device, or any other type of computing device.

The processor platform 800 of the illustrated example includes a processor 810 and an accelerator 812. The processor 810 of the illustrated example is hardware. For example, the processor 810 can be implemented by one or more integrated circuits, logic circuits, microprocessors, GPUs, DSPs, or controllers from any desired family or manufacturer. The hardware processor may be a semiconductor based (e.g., silicon based) device. Additionally, the accelerator 812 can be implemented by, for example, one or more integrated circuits, logic circuits, microprocessors, GPUs, DSPs, FPGAs, VPUs, controllers, and/or other CBBs from any desired family or manufacturer. The accelerator 812 of the illustrated example is hardware. The hardware accelerator may be a semiconductor based (e.g., silicon based) device. In this example, the accelerator 812 implements the example credit manager 210, the example CnC fabric 212, the example convolution engine 214, the example MMU 216, the example RNN engine 218, the example DSP 220, the example memory 222, the example configuration controller 224, and/or the example kernel bank 232. In this example, the processor implements the example CBB analyzer 302, the example kernel analyzer 304, the example compiler interface 306, and/or, more generally, the example selector 300 and/or the example one or more selector(s) 204 of FIGS. 2 and/or 3, the example graph interface 402, the example selector interface 404, the example workload analyzer 406, the example executable generator 408, the example datastore 410, the example plugin 236, and/or, more generally, the example graph compiler 202 of FIGS. 2 and/or 4, and/or the example credit manager 210, the example CnC fabric 212, the example convolution engine 214, the example MMU 216, the example RNN engine 218, the example DSP 220, the example memory 222, the example configuration controller 224, the example kernel bank 232, and/or, more generally, the example accelerator 208 of FIG. 2.

The processor 810 of the illustrated example includes a local memory 811 (e.g., a cache). The processor 810 of the illustrated example is in communication with a main memory including a volatile memory 814 and a non-volatile memory 816 via a bus 818. Moreover, the accelerator 812 of the illustrated example includes a local memory 813 (e.g., a cache). The accelerator 812 of the illustrated example is in communication with a main memory including the volatile memory 814 and the non-volatile memory 816 via the bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 810 and/or the accelerator 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 6 and/or 7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that configure heterogenous components in an accelerator. The disclosed methods, apparatus, and articles of manufacture improve the efficiency of using a computing device by generating and/or otherwise providing a selector for each workload node in a workload. As such, the disclosed methods, apparatus, and articles of manufacture enable a graph compiler to generate an executable file without having to be individually configured for each heterogenous compute building block and/or kernel in the accelerator. Additionally, examples disclosed herein include a credit manager to distribute and/or receive credits from the heterogenous compute building blocks and/or kernels in the accelerator. In such a manner, the compute building blocks and/or kernels are able to communicate with other heterogenous compute building blocks and/or kernels through a center fabric and the credit manager. Examples disclosed herein enable a graph compiler to efficiently map a workload (e.g., graph received) for any number of heterogenous compute building blocks and/or kernels in the accelerator. Examples disclosed herein likewise enable a graph generator to efficiently map a workload (e.g., graph) received if additional compute building blocks and/or kernels are later included in the accelerator, or if the current compute building blocks and/or kernels are altered or adjusted. The disclosed methods, apparatus and articles of manufacture are accordingly directed to one or more improvement(s) in the functioning of a computer.

Example methods, apparatus, systems, and articles of manufacture to methods and apparatus to configure heterogenous components in an accelerator are disclosed herein. Further examples and combinations thereof include the following:

Example 1 includes an apparatus to configure heterogenous components in an accelerator, the apparatus comprising a graph compiler to identify a workload node in a workload, and generate a selector for the workload node, and the selector to identify an input condition and an output condition of a compute building block, wherein the graph compiler is to, in response to obtaining the identified input condition and output condition from the selector, map the workload node to the compute building block.

Example 2 includes the apparatus of example 1, wherein the graph compiler is to identify a second workload node in the workload, and generate a second selector for the second workload node.

Example 3 includes the apparatus of example 2, wherein the second selector is to identify a second input condition and a second output condition of the kernel.

Example 4 includes the apparatus of example 1, wherein the workload is a graph including the workload node obtained by the graph compiler.

Example 5 includes the apparatus of example 1, wherein the input condition corresponds to an input requirement of the compute building block and the output condition corresponds to a result of execution of the compute building block.

Example 6 includes the apparatus of example 1, wherein the graph compiler is to generate an executable file in response to mapping the workload node to the compute building block.

Example 7 includes the apparatus of example 1, wherein the graph compiler further includes a plugin to, based on the identified input condition and output condition, form a translation layer between the workload node and the compute building block to enable mapping of the workload node to the compute building block.

Example 8 includes at least one non-transitory computer readable storage medium comprising instructions which, when executed, cause at least one processor to at least identify a workload node in a workload, generate a selector for the workload node, the selector associated with a compute building block to execute the workload node, identify an input condition and an output condition of the compute building block, and in response to obtaining the identified input condition and output condition, map the workload node to the compute building block.

Example 9 includes the at least one non-transitory computer readable storage medium of example 8, wherein the instructions, when executed, further cause the at least one processor identify a second workload node in the workload, and generate a second selector for the second workload node.

Example 10 includes the at least one non-transitory computer readable storage medium of example 9, wherein the instructions, when executed, further cause the at least one processor to identify a second input condition and a second output condition of a kernel.

Example 11 includes the at least one non-transitory computer readable storage medium of example 8, wherein the workload is a graph including the workload node.

Example 12 includes the non-transitory computer readable storage medium of example 8, wherein the input condition corresponds to an input requirement of the compute building block and the output condition corresponds to a result of execution of the compute building block.

Example 13 includes the at least one non-transitory computer readable storage medium of example 8, wherein the instructions, when executed, further cause the at least one processor to generate an executable file in response to mapping the workload node to the compute building block.

Example 14 includes the at least one non-transitory computer readable storage medium of example 8, wherein the instructions, when executed, further cause the at least one processor to, based on the identified input condition and output condition, form a translation layer between the workload node and the compute building block to enable mapping of the workload node to the compute building block.

Example 15 includes an apparatus comprising means for compiling to identify a workload node in a workload, and generate a means for selecting for the workload node, the means for selecting associated with a compute building block to execute the workload node, and the means for selecting to identify an input condition and an output condition of the compute building block, wherein the means for compiling is further to, in response to obtaining the identified input condition and output condition, map the workload node to the compute building block.

Example 16 includes the apparatus of example 15, wherein the means for compiling is further to identify a second workload node in the workload, and generate a second means for selecting for the second workload node.

Example 17 includes the apparatus of example 16, wherein the second means for selecting is further to identify a second input condition and a second output condition of a kernel.

Example 18 includes the apparatus of example 15, wherein the workload is a graph including the workload node.

Example 19 includes the apparatus of example 15, wherein the input condition corresponds to an input requirement of the compute building block and the output condition corresponds to a result of execution of the compute building block.

Example 20 includes the apparatus of example 15, wherein the means for compiling is further to generate an executable file in response to mapping the workload node to the compute building block.

Example 21 includes the apparatus of example 15, wherein the means for compiling is further to, based on the identified input condition and output condition, form a translation layer between the workload node and the compute building block to enable mapping of the workload node to the compute building block.

Example 22 includes a method to configure heterogenous components in an accelerator, the method comprising identifying a workload node in a workload, generating a selector for the workload node, the selector associated with a compute building block to execute the workload node, identifying an input condition and an output condition of the compute building block, and in response to obtaining the identified input condition and output condition, mapping the workload node to the compute building block.

Example 23 includes the method of example 22, further including identifying a second workload node in the workload, and generating a second selector for the second workload node.

Example 24 includes the method of example 23, further including identifying a second input condition and a second output condition of a kernel.

Example 25 includes the method of example 22, wherein the workload is a graph including the workload node.

Example 26 includes the method of example 22, wherein the input condition corresponds to an input requirement of the compute building block and the output condition corresponds to a result of execution of the compute building block.

Example 27 includes the method of example 22, further including generating an executable file in response to mapping the workload node to the compute building block.

Example 28 includes the method of example 22, further including based on the identified input condition and output condition, forming a translation layer between the workload node and the compute building block to enable mapping of the workload node to the compute building block.

Example 29 includes an apparatus to operate heterogenous components, the apparatus comprising a buffer including a number of data slots, a credit manager, a first compute building block having a first credit value, the first compute building block to execute a first workload node, in response to executing the first workload node, write data to a subset of the number of data slots, and transmit a second credit value to the credit manager, the second credit value being less than the first credit value, and a second compute building block to in response to receiving the second credit value from the credit manager, read the data in the subset of the number of data slots, and execute a second workload node.

Example 30 includes the apparatus of example 29, further including a controller to transmit a control message and a configure message to the first compute building block to provide the first workload node.

Example 31 includes the apparatus of example 30, wherein the controller is to transmit the first workload node to the first compute building block and to transmit the second workload node to the second compute building block.

Example 32 includes the apparatus of example 29, wherein the credit manager is further to determine whether execution of the first workload node is complete.

Example 33 includes the apparatus of example 29, wherein the second compute building block is further to transmit a third credit value to the credit manager, the third credit value being less than the second credit value.

Example 34 includes the apparatus of example 33, wherein the credit manager is further to transmit the third credit value to the first compute building block.

Example 35 includes at least one non-transitory computer readable storage medium comprising instructions which, when executed, cause at least one processor to at least execute a first workload node, in response to executing the first workload node, write data to a number of data slots using a first credit value, transmit a second credit value to a credit manager, the second credit value being less than the first credit value, in response to receiving the second credit value from the credit manager, read the data in the number of data slots using the second credit value, and execute a second workload node.

Example 36 includes the at least one non-transitory computer readable storage medium of example 35, wherein the instructions, when executed, further cause the at least one processor to transmit a control message and a configure message to provide the first workload node.

Example 37 includes the at least one non-transitory computer readable storage medium of example 36, wherein the instructions, when executed, further cause the at least one processor to transmit the first workload node to a first compute building block and to transmit the second workload node to a second compute building block.

Example 38 includes the at least one non-transitory computer readable storage medium of example 35, wherein the instructions, when executed, further cause the at least one processor to determine whether execution of the first workload node is complete.

Example 39 includes the at least one non-transitory computer readable storage medium of example 35, wherein the instructions, when executed, further cause the at least one processor to transmit a third credit value to the credit manager, the third credit value being less than the second credit value.

Example 40 includes the at least one non-transitory computer readable storage medium of example 39, wherein the instructions, when executed, further cause the at least one processor to transmit the third credit value to a compute building block.

Example 41 includes an apparatus comprising first means for computing to execute a first workload node, in response to executing the first workload node, write data to a number of data slots using a first credit value, and transmit a second credit value to a means for credit managing, the second credit value being less than the first credit value, and second means for computing to in response to receiving the second credit value from the means for credit managing, read the data in the number of data slots using the second credit value, and execute a second workload node.

Example 42 includes the apparatus of example 41, further including means for controlling to transmit a control message and a configure message to the first means for computing to provide the first workload node.

Example 43 includes the apparatus of example 42, wherein the means for controlling is further to transmit the first workload node to the first means for computing and to transmit the second workload node to the second means for computing.

Example 44 includes the apparatus of example 41, wherein the means for credit managing is further to determine whether execution of the first workload node is complete.

Example 45 includes the apparatus of example 41, wherein the second means for computing is further to transmit a third credit value to the means for credit managing, the third credit value being less than the second credit value.

Example 46 includes the apparatus of example 45, wherein the means for credit managing is further to transmit the third credit value to the first means for computing.

Example 47 includes a method to operate heterogenous components, the method comprising executing a first workload node, in response to executing the first workload node, writing data to a number of data slots using a first credit value, transmitting a second credit value to a credit manager, the second credit value being less than the first credit value, in response to receiving the second credit value from the credit manager, reading the data in the number of data slots using the second credit value, and executing a second workload node.

Example 48 includes the method of example 47, further including transmitting a control message and a configure message to a compute building block to provide the first workload node.

Example 49 includes the method of example 47, further including transmitting the first workload node to a first compute building block and transmitting the second workload node to a second compute building block.

Example 50 includes the method of example 47, wherein further including determining whether execution of the first workload node is complete.

Example 51 includes the method of example 47, further including transmitting a third credit value to the credit manager, the third credit value being less than the second credit value.

Example 52 includes the method of example 51, further including transmitting the third credit value to a compute building block.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a communication fabric;
machine readable instructions;
a secondary memory associated with a secondary programmable circuitry, the secondary programmable circuitry in communication with primary programmable circuitry, the primary programmable circuitry associated with a primary memory;
the secondary programmable circuitry to at least one of instantiate or execute the machine readable instructions to:
receive, via the communication fabric, a first workload from the primary programmable circuitry;
allocate, via the communication fabric, a first memory portion to the first workload, the first memory portion located in either the primary memory or the secondary memory;
receive, via the communication fabric, a second workload from the primary programmable circuitry; and
allocate, via the communication fabric, a second memory portion to the second workload, the second memory portion located in either the primary memory or the secondary memory, the location of the second memory portion based on a relationship between the first workload and the second workload.

2. The apparatus of claim 1, wherein the location of the first memory portion is based on one or more allocation factors.

3. The apparatus of claim 2, wherein the one or more allocation factors include an amount of memory to be allocated, a type of the primary memory, a type of the secondary memory, an available capacity of the primary memory, and an available capacity of the secondary memory.

4. The apparatus of claim 1, wherein the secondary programmable circuitry is an Application Specific Integrated Circuit (ASIC).

5. The apparatus of claim 1, wherein the communication fabric includes peripheral component interconnect express (PCIE) circuitry to enable an exchange of data between the primary programmable circuitry and the secondary programmable circuitry.

6. The apparatus of claim 1, wherein the communication fabric implements an Advanced extensible Interface (AXI) protocol to enable an exchange of data between the secondary programmable circuitry and the secondary memory.

7. The apparatus of claim 1, wherein the machine readable instructions cause the secondary programmable circuitry to implement a plugin that allocates the first memory portion and the second memory portion.

8. The apparatus of claim 7, wherein:
the primary programmable circuitry and the secondary programmable circuitry have heterogeneous hardware architectures; and
the machine readable instructions cause the secondary programmable circuitry to provide a description of the heterogeneous hardware architectures to the plugin in a unified format.

9. The apparatus of claim 1, wherein the first workload corresponds to an artificial intelligence application.

10. A secondary non-transitory machine readable storage medium comprising instructions associated with secondary programmable circuitry;
the secondary programmable circuitry in communication with primary programmable circuitry, the primary programmable circuitry associated with a primary non-transitory machine readable storage medium, the instructions to cause the secondary programmable circuitry to at least:
receive, via a communication fabric, a first workload from the primary programmable circuitry;
allocate, via the communication fabric, a first memory portion to the first workload, the first memory portion located in either the primary non-transitory machine readable storage medium or the secondary non-transitory machine readable storage medium;
receive, via the communication fabric, a second workload from the primary programmable circuitry; and
allocate, via the communication fabric, a second memory portion to the second workload, the second memory portion located in either the primary non-transitory machine readable storage medium or the secondary non-transitory machine readable storage medium, the location of the second memory portion based on a relationship between the first workload and the second workload.

11. The secondary non-transitory machine readable storage medium of claim 10, wherein the location of the first memory portion is based on one or more allocation factors.

12. The secondary non-transitory machine readable storage medium of claim 11, wherein the one or more allocation factors include an amount of memory to be allocated, a type of the primary non-transitory machine readable storage medium, a type of the secondary non-transitory machine readable storage medium, an available capacity of the primary non-transitory machine readable storage medium, and an available capacity of the secondary non-transitory machine readable storage medium.

13. The secondary non-transitory machine readable storage medium of claim 10, wherein the secondary programmable circuitry is an Application Specific Integrated Circuit (ASIC).

14. The secondary non-transitory machine readable storage medium of claim 10, wherein the communication fabric includes peripheral component interconnect express (PCIE) circuitry to enable an exchange of data between the primary programmable circuitry and the secondary programmable circuitry.

15. The secondary non-transitory machine readable storage medium of claim 10, wherein the communication fabric implements an Advanced extensible Interface (AXI) protocol to enable an exchange of data between the secondary programmable circuitry and the secondary non-transitory machine readable storage medium.

16. The secondary non-transitory machine readable storage medium of claim 10, wherein the instructions cause the secondary programmable circuitry to implement a plugin that allocates the first memory portion and the second memory portion.

17. The secondary non-transitory machine readable storage medium of claim 16, wherein:
the primary programmable circuitry and the secondary programmable circuitry have heterogeneous hardware architectures; and
the instructions cause the secondary programmable circuitry to provide a description of the heterogeneous hardware architectures to the plugin in a unified format.

18. The secondary non-transitory machine readable storage medium of claim 10, wherein the first workload corresponds to an artificial intelligence application.

19. A method comprising:
executing instructions with secondary programmable circuitry associated with a second memory, the secondary programmable circuitry in communication with primary programmable circuitry, the primary programmable circuitry associated with a primary memory, wherein executing the instructions causes the secondary programmable circuitry to:
receive, via a communication fabric, a first workload from the primary programmable circuitry;
allocate, via the communication fabric, a first memory portion to the first workload, the first memory portion located in either the primary memory or the secondary memory;
receive, via the communication fabric, a second workload from the primary programmable circuitry; and
allocate, via the communication fabric, a second memory portion to the second workload, the second memory portion located in either the primary memory or the secondary memory, the location of the second memory portion based on a relationship between the first workload and the second workload.

20. The method of claim 19, wherein the location of the first memory portion is based on one or more allocation factors.

* * * * *